United States Patent
Lapp

(10) Patent No.: US 8,629,774 B2
(45) Date of Patent: Jan. 14, 2014

(54) CABLE RECEIVING UNIT

(75) Inventor: Siegbert Lapp, Stuttgart (DE)

(73) Assignee: Lapp Engineering & Co., Cham (CH)

(*) Notice: Subject to any disclaimer, the term of this patent is extended or adjusted under 35 U.S.C. 154(b) by 1004 days.

(21) Appl. No.: 12/657,436

(22) Filed: Jan. 19, 2010

(65) Prior Publication Data

US 2010/0165557 A1    Jul. 1, 2010

Related U.S. Application Data

(63) Continuation of application No. PCT/EP2008/059196, filed on Jul. 14, 2008.

(30) Foreign Application Priority Data

Jul. 19, 2007 (DE) .......... 10 2007 035 047
Aug. 4, 2007 (DE) .......... 10 2007 036 948

(51) Int. Cl.
*G08B 13/14* (2006.01)

(52) U.S. Cl.
USPC .................. 340/572.1; 340/10.51

(58) Field of Classification Search
USPC ............ 340/572.1, 10.51; 235/375, 434, 487; 398/28, 13, 20, 22, 139; 702/138
See application file for complete search history.

(56) References Cited

U.S. PATENT DOCUMENTS

| | | |
|---|---|---|
| 4,751,614 A | 6/1988 | Mehnert |
| 4,880,484 A | 11/1989 | Obermeier et al. |
| 5,045,368 A | 9/1991 | Cosman et al. |
| 5,106,175 A | 4/1992 | Davis et al. |
| 5,305,410 A | 4/1994 | Arroyo |
| 5,532,598 A | 7/1996 | Clark, Jr. et al. |
| 5,541,803 A | 7/1996 | Pope, Jr. et al. |
| 5,577,147 A | 11/1996 | Arroyo et al. |
| 5,578,926 A | 11/1996 | Reinhardt |
| 5,729,966 A | 3/1998 | Grulick |
| 5,808,779 A | 9/1998 | Weis |
| 5,892,430 A | 4/1999 | Wiesman et al. |
| 5,902,251 A | 5/1999 | vanHooydonk |
| 5,986,207 A | 11/1999 | Uhlenhuth |
| 6,172,608 B1 | 1/2001 | Cole |
| 6,246,328 B1 | 6/2001 | Parkinson et al. |
| 6,388,575 B1 | 5/2002 | Galloway |
| 6,563,094 B2 | 5/2003 | Kochman et al. |
| 6,791,454 B2 | 9/2004 | Mangold et al. |
| 6,897,822 B2 | 5/2005 | Sparks et al. |
| 6,915,050 B2 | 7/2005 | Koyasu et al. |
| 6,973,243 B2 | 12/2005 | Koyasu et al. |
| 7,041,906 B2 | 5/2006 | John |
| 7,046,146 B2 | 5/2006 | Wuidart et al. |
| 7,158,012 B2 | 1/2007 | Wiesman et al. |
| 7,170,405 B2 | 1/2007 | Daum et al. |
| 7,201,221 B2 | 4/2007 | Tubel et al. |

(Continued)

FOREIGN PATENT DOCUMENTS

| | | |
|---|---|---|
| CA | 2 581 186 | 5/2006 |
| DE | 17 65 765 | 8/1971 |

(Continued)

*Primary Examiner* — Toan N Pham
(74) *Attorney, Agent, or Firm* — Lipsitz & McAllister, LLC

(57) ABSTRACT

In order to reliably and simply acquire data for a cable receiving unit for a cable portion, the cable receiving unit is associated with an information carrier unit from which information can be read out by electromagnetic field coupling.

30 Claims, 33 Drawing Sheets

(56) References Cited

U.S. PATENT DOCUMENTS

| | | |
|---|---|---|
| 7,223,962 B2 | 5/2007 | Fageraas et al. |
| 7,265,533 B2 | 9/2007 | Lightbody et al. |
| 7,313,304 B2 | 12/2007 | Andrews et al. |
| 7,526,163 B2 | 4/2009 | Freeland et al. |
| 7,526,582 B2 * | 4/2009 | Best et al. ............ 710/15 |
| 7,539,379 B2 | 5/2009 | Khoshaba et al. |
| 7,552,872 B2 * | 6/2009 | Tokita et al. ............ 235/440 |
| 7,618,291 B2 | 11/2009 | Standke |
| 7,856,185 B2 * | 12/2010 | Hudgins et al. ............ 398/135 |
| 7,940,182 B2 | 5/2011 | Lange et al. |
| 8,023,786 B2 | 9/2011 | Lapp |
| 2002/0034365 A1 | 3/2002 | Vogelsang |
| 2002/0061727 A1 | 5/2002 | Mangold et al. |
| 2004/0149488 A1 | 8/2004 | John |
| 2004/0156601 A1 | 8/2004 | Koyasu et al. |
| 2004/0184747 A1 | 9/2004 | Koyasu et al. |
| 2005/0083203 A1 | 4/2005 | Surkau |
| 2005/0129088 A1 | 6/2005 | Rajendran et al. |
| 2005/0140512 A1 | 6/2005 | Sakama et al. |
| 2006/0012482 A1 | 1/2006 | Zalud et al. |
| 2006/0214801 A1 | 9/2006 | Murofushi et al. |
| 2007/0146230 A1 | 6/2007 | Overhultz et al. |
| 2008/0204235 A1 | 8/2008 | Cook |
| 2008/0218355 A1 | 9/2008 | Downie et al. |
| 2008/0318477 A1 | 12/2008 | Standke |
| 2009/0001930 A1 | 1/2009 | Pohjonen |
| 2009/0146898 A1 | 6/2009 | Akiho et al. |
| 2009/0156042 A1 | 6/2009 | Radenne et al. |
| 2010/0109670 A1 | 5/2010 | Arnaud et al. |
| 2010/0142902 A1 | 6/2010 | Lapp |
| 2010/0147583 A1 | 6/2010 | Lapp |
| 2010/0158454 A1 | 6/2010 | Lapp |
| 2010/0166374 A1 | 7/2010 | Lapp |
| 2010/0172618 A1 | 7/2010 | Lapp |

FOREIGN PATENT DOCUMENTS

| | | |
|---|---|---|
| DE | 36 20 595 | 2/1987 |
| DE | 37 43 470 | 3/1989 |
| DE | 43 33 121 | 5/1994 |
| DE | 690 09 113 | 11/1994 |
| DE | 690 14 521 | 6/1995 |
| DE | 690 16 035 | 6/1995 |
| DE | 196 01 651 | 7/1997 |
| DE | 196 39 902 | 12/1997 |
| DE | 197 02 536 | 7/1998 |
| DE | 198 14 540 | 10/1999 |
| DE | 299 21 017 | 5/2000 |
| DE | 695 16 138 | 12/2000 |
| DE | 199 55 120 | 5/2001 |
| DE | 101 11 371 | 9/2002 |
| DE | 101 44 552 | 2/2004 |
| DE | 20 2004 017 158 | 2/2005 |
| DE | 10 2004 051 594 | 5/2006 |
| DE | 10 2005 006 318 | 8/2006 |
| DE | 20 2005 006 373 | 8/2006 |
| DE | 10 2005 044 918 | 2/2007 |
| DE | 10 2005 044 482 | 4/2007 |
| DE | 10 2005 058 385 | 6/2007 |
| DE | 10 2006 036 719 | 2/2008 |
| DE | 10 2006 036 721 | 2/2008 |
| EP | 0 408 320 | 1/1991 |
| EP | 0 419 637 | 11/1994 |
| EP | 1 191 354 | 3/2002 |
| EP | 1 220 236 | 7/2002 |
| EP | 1 424 882 | 6/2004 |
| EP | 1 548 639 | 6/2005 |
| EP | 1 772 657 | 4/2007 |
| EP | 1 884 811 | 2/2008 |
| FR | 2 830 941 | 4/2003 |
| JP | 2003203527 | 7/2003 |
| JP | 2005184424 | 7/2005 |
| WO | 90/10879 | 9/1990 |
| WO | 91/04503 | 4/1991 |
| WO | 95/32439 | 11/1995 |
| WO | 03/067512 | 8/2003 |
| WO | 03/091665 | 11/2003 |
| WO | 2004/072988 | 8/2004 |
| WO | 2006/063023 | 6/2006 |
| WO | 2007/016956 | 2/2007 |
| WO | 2007/036346 | 4/2007 |

\* cited by examiner

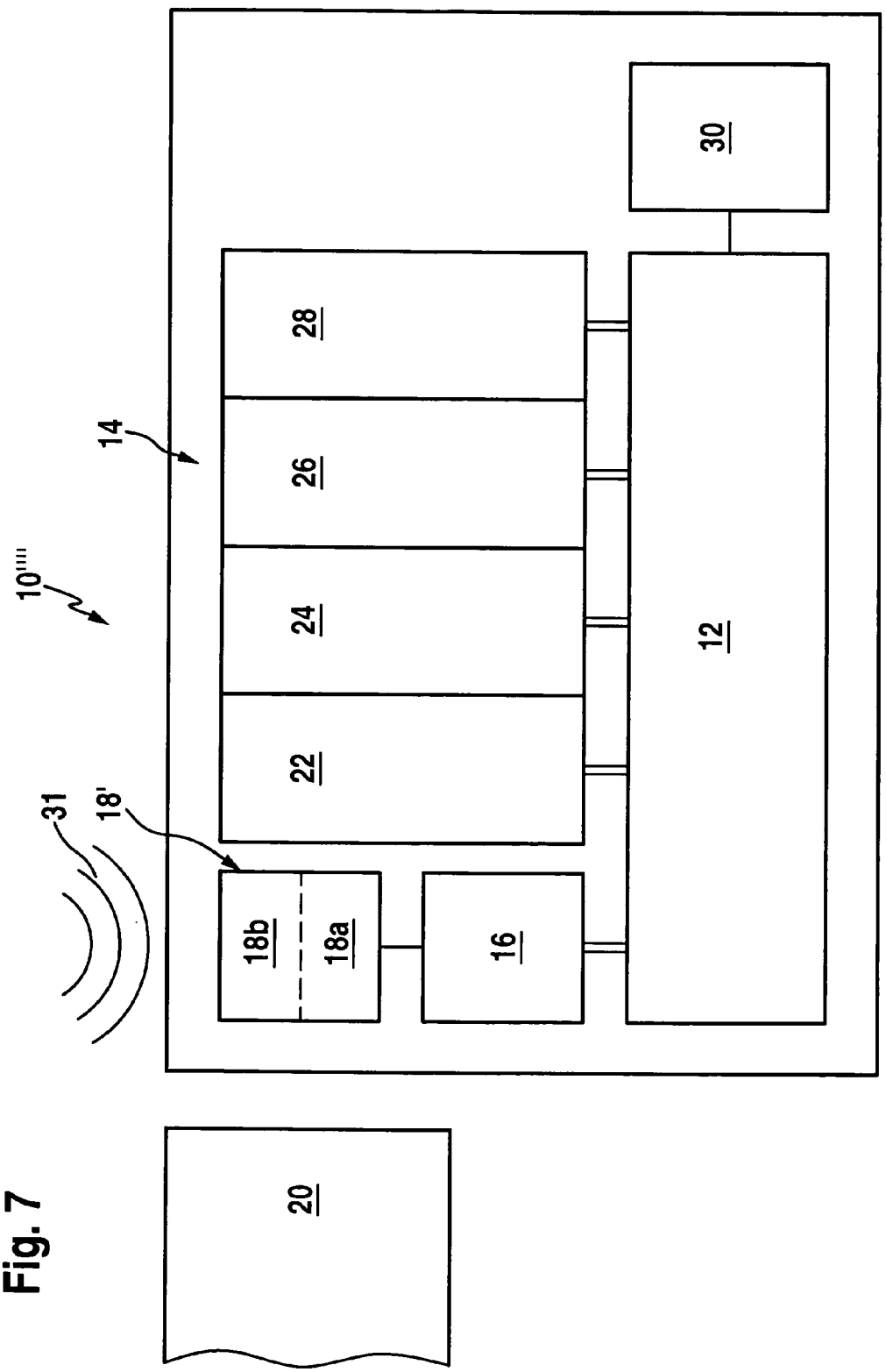

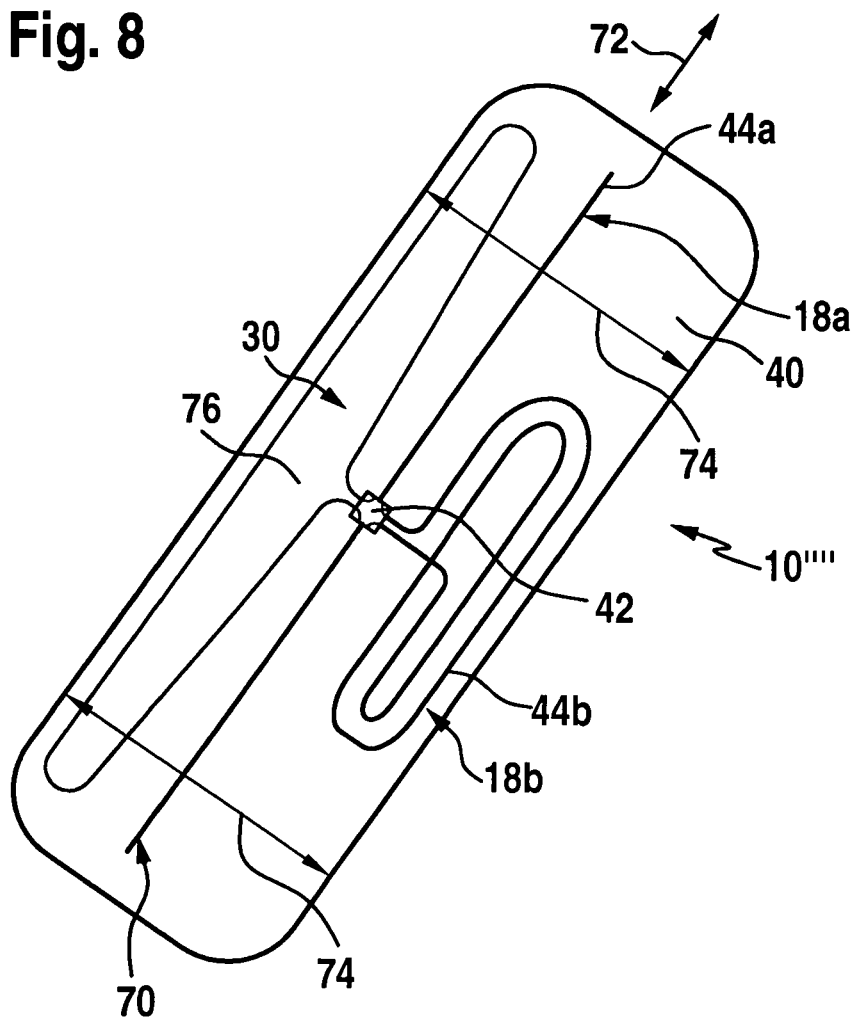

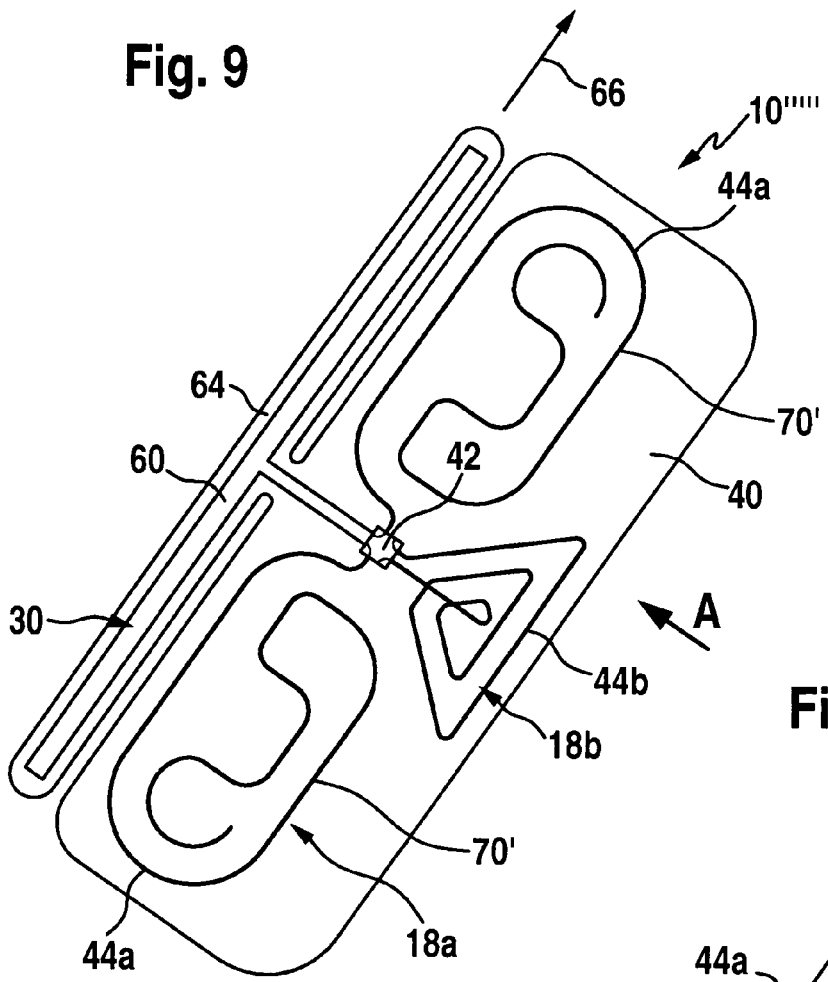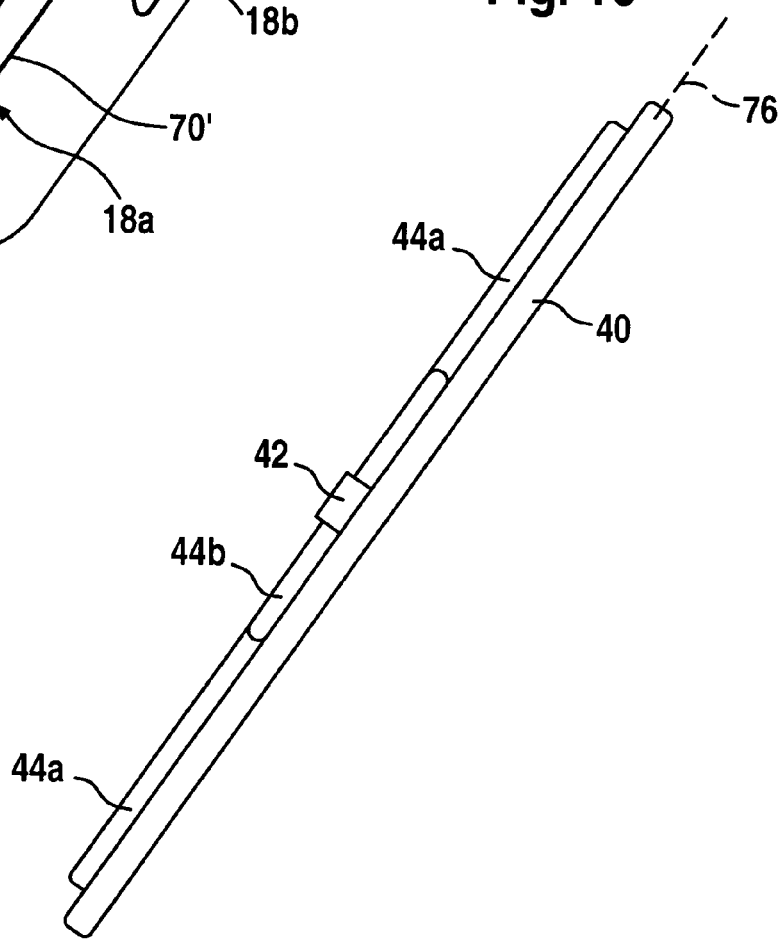

CABLE RECEIVING UNIT

This application is a continuation of International application No. PCT/EP2008/059196 filed on Jul. 14, 2008.

This patent application claims the benefit of International application No. PCT/EP2008/059196 of Jul. 14, 2008 and German applications No. 10 2007 035 047.5 of Jul. 19, 2007 and No. 10 2007 036 948.6 of Aug. 4, 2007, the teachings and disclosure of which are hereby incorporated in their entirety by reference thereto.

BACKGROUND OF THE INVENTION

The invention relates to a cable receiving unit for a cable portion.

Cable receiving units of this kind are usually plug-in connector elements, cable glands or the like, elements connected to a cable portion which, with pre-prepared cable portions, are sold as a ready-assembled cable assembly, or cable receiving units which are usually fitted in items of equipment and serve the purpose of establishing a connection between the equipment and a cable portion.

In the case of cable receiving units of this kind, there is often the problem of reliably transmitting to a user data concerning said units or an installation environment or specifications of said environment.

It is therefore an object of the invention to make such transmission of data reliable and easy to pick up.

SUMMARY OF THE INVENTION

This object is achieved according to the invention in the case of a cable receiving unit of the type described at the beginning by an information carrier unit, from which information can be read out by electromagnetic field coupling, being associated with the cable receiving unit.

The advantage of this solution can be seen in that, with an information carrier unit of this kind, there is the possibility on the one hand of storing a large number of items of information and on the other hand of also storing complex information, some of which is even related to the individual product, and of making said information accessible to a user by reading-out.

With regard to the way in which the information carrier unit is disposed in the cable receiving unit, a very wide variety of solutions are conceivable.

An advantageous solution thus provides that the information carrier unit is disposed on a base part of the cable receiving unit.

In principle, the information carrier unit could in this case be disposed on top of the base part.

The information carrier unit is particularly protected if it is disposed in the base part.

Disposing the information carrier unit in this way in the base part is advantageously realized by the information carrier unit being disposed in a recess in the base part.

The recess may be disposed on different sides of the base part.

A particularly protected way in which the information carrier unit is disposed provides that the recess extends into the base part from an interior space within the base part.

This ensures optimum protection of the information carrier unit.

On the other hand, there is the problem that, when the base part is formed as a metal part, the metal causes damping effects, which suppress, or at least impair, the electromagnetic field coupling for reading out the information from the information carrier unit.

For this reason, it is advantageously provided that the recess extends into the base part from an outer side of the base part.

If, in the case of an exemplary embodiment such as this, the base part is, for example, formed from metal, preferably provided between the information carrier unit and the metal is a layer shielding against disturbing influences of the metal, preferably a ferrite layer, which shields the electromagnetic field that is required for the communication in the information carrier unit, from the metal, and consequently allows communication between a read/write device and the information carrier unit by way of electromagnetic fields and also magnetic fields.

In such a case, the communication preferably takes place in the low frequency or high frequency range.

Furthermore, in such a case, a spacing layer should also preferably be provided between an antenna unit of the information carrier unit and the layer shielding the electromagnetic field from the metal, to allow the most optimal possible propagation of the electromagnetic field permeating the antenna unit.

Another advantageous possibility provides that the information carrier unit is embedded in the base part. Embedding of this kind of the information carrier unit in the base part can be realized in particular when the base part is produced as a part made of a plastics material, in particular as a plastics injection molding.

In addition, an advantageous way of disposing the information carrier unit in the cable receiving unit provides that the information carrier unit is associated with a receptacle for the cable portion, the receptacle being provided in the cable receiving unit.

In this case, the receptacle for the cable portion may be located on the base part.

However, it is also conceivable for the receptacle to be associated with a holding unit of the cable receiving unit.

In this case, it is advantageously provided that the information carrier unit is disposed in a holding unit of the cable receiving unit, the holding unit engaging the cable portion.

It is particularly advantageous, in particular whenever it is intended for the information carrier unit to be disposed as close as possible to the cable portion, if the information carrier unit is disposed in a part of the holding unit that engages the cable portion in a frictionally retaining manner, so that for example also information concerning the cable portion can be picked up by the information carrier unit.

In the simplest case, disposing the information carrier unit in this way can be realized when the information carrier unit is located in a recess provided on the holding unit.

As an alternative to forming the receptacle as a holding element, another advantageous solution provides that the receptacle is a protective element enclosing an end piece of the cable portion.

A protective element of this kind may, for example, be a protective sleeve for the cable portion or an arrangement to conceal the cable portion from view.

It is, for example, conceivable in this respect for the information carrier unit to be disposed on the protective element.

Disposing the information carrier unit on the protective element can be realized, for example, by the information carrier unit being disposed in a wall portion of the protective element, the wall portion either having a recess or the information carrier unit being embedded in the wall portion.

Another advantageous solution provides that the information carrier unit is disposed such that it is covered by the protective element.

This means that the information carrier unit is in this case no longer held directly on the protective element but is primarily covered by it.

An information carrier unit could provide, for example, that the information carrier unit is held such that it is covered over by the protective element and for example fixed by the protective element to the end piece of the cable portion, for example fixed in a frictionally retaining manner.

A suitable embodiment also provides that the information carrier unit is disposed on the end piece of the cable portion, and consequently is seated primarily on the end piece of the cable portion and merely covered by the protective element.

It is for example provided in this respect that the information carrier unit is also fixed directly on the end piece, for example by the information carrier unit being adhesively attached to the end piece.

With regard to the way in which the protective element is arranged as part of the cable receiving unit in relation to housing parts of the cable receiving unit, an advantageous exemplary embodiment provides that the protective element is held on a housing part of the cable receiving unit.

It is preferably provided in this respect that the protective element is provided with a holding lip, which is held on the housing part of the cable receiving unit.

The protective element is usually formed in this case in such a way that it extends over this holding housing part, that is to say that the protective element extends as part of the cable receiving unit away from the housing part or the housing parts of the cable receiving unit, and consequently is the only element still surrounding the end piece in this region.

In order to obtain the most optimal possible coupling between the information carrier unit and a read/write device for the exchange of data with the information carrier unit, it is preferably provided that the protective element is formed from an electrically and magnetically nonconducting material.

The protective element is in this case preferably produced from rubber or a plastics material.

In order also to develop an adequate protective effect for the end piece of the cable portion and create a transition from a flexible cable portion to the rigid housing parts of the cable receiving unit that does not adversely affect the cable portion, it is provided that the protective element is made of a deformable material, that is to say that the protective element is at least flexible.

Another advantageous possible way of disposing the information carrier unit provides that the information carrier unit is associated with a contact carrier of the cable receiving unit.

An association of this kind with a contact carrier can likewise be realized in various ways, provided that the contact carrier is disposed in an electrically nonconducting housing.

An advantageous solution thus provides that the information carrier unit is disposed in the contact carrier.

This can be advantageously realized, for example, by the information carrier unit being located in a recess in the contact carrier.

As an alternative to this, it is provided that the information carrier unit is embedded in the material of the contact carrier.

With regard to the way in which the information carrier unit is located in a recess, a very wide variety of solutions are conceivable. For example, the information carrier unit could be adhesively secured in the recess.

However, the information carrier unit is located in the recess particularly securely and reliably if the information carrier unit is fixed in the respective recess by a casting compound, and is consequently hermetically encapsulated with respect to the surroundings by the casting compound.

With regard to the data stored in the information carrier unit, which can then be read out by electromagnetic field coupling, no further details have been specified so far.

An advantageous solution thus provides that design data can be read out from the information carrier unit, that is to say data concerning the structural design of the cable receiving unit.

Furthermore, it is advantageous if functional data can be read out from the information carrier unit, that is to say in this case that the functional data comprise information on how electrical wiring of the cable portion or of the contacts of the cable receiving unit should be performed.

It is particularly advantageous if data of a cable assembly comprising the cable receiving unit can be read out from the information carrier unit, that is to say that the data concerning the entire cable assembly of which the cable receiving unit is a component part, are stored in the information carrier unit.

These may be, on the one hand, data of the internal wiring in the cable assembly.

However, it is likewise conceivable for these to be data concerning suitable ambient conditions for the cable assembly or concerning the areas of use of the cable assembly or else concerning the service life of the cable assembly under defined environmental conditions.

A particularly advantageous solution provides that measurement data of the cable assembly can be read out from the information carrier unit. That is to say that the ready-assembled cable assembly is measured and these measurement data are stored in the information carrier unit, so that a user can see immediately to what extent and to what degree the cable assembly according to the invention meets or surpasses the specifications, and consequently can be used in the case of critical loads.

With regard to the structure of the information carrier unit according to the invention, no further details have been specified so far.

Within the scope of the solution according to the invention, however, it is not only conceivable for the information carrier unit itself to carry data and for it to be possible for data to be read out from it, but it is also provided in the case of a further advantageous variant of the solution according to the invention that the information carrier unit communicates with a further information carrier unit.

For example, for this purpose the further information carrier unit is an information carrier unit provided independently of the cable assembly.

An information carrier unit of this kind provided independently of the cable assembly in this way is located for example on a device associated with the cable assembly.

A device of this kind may be, for example, an item of equipment to which the cable assembly is to be connected or the device may simply be a receptacle in which the cable assembly can be fitted or installed in some way or other.

In particular, in the case of associations between the cable assembly and the device that are relevant to safety or security, the information carrier units can be used to the effect that the correctness of the association of the cable assembly and the device can be verified by means of at least one of the information carrier units.

A simple possible way of verifying the association takes place by means of a mobile read/write device, which reads out the information from an information carrier unit of the cable assembly and an information carrier unit of the device separately and determines the association on that basis.

Verification such as this may also be performed for example by the information carrier units exchanging data with one another and by the at least one information carrier unit, for example activated by a read/write device, detecting whether the other information carrier unit is the correct information carrier unit on the basis of the association.

In order to avoid incorrect associations between the cable assembly and a device, it is preferably provided that the correctness or incorrectness of the association can be indicated by means of the at least one information carrier unit.

An indication such as this may take place for example by reading out from the one information carrier unit being carried out by means of a read/write device.

An indication such as this can be realized even more easily when the at least one activated information carrier unit is provided with an optical display.

Another advantageous embodiment of the solution according to the invention provides that the information carrier unit communicates with at least one information carrier unit in the cable portion.

In this case, the communication with one of the at least one information carrier unit in the cable portion could take place electrical contacting.

It is particularly advantageous, however, if the information carrier unit communicates in a non-contact manner with the at least one information carrier unit.

In particular, it is advantageous if the information carrier unit communicates with the at least one information carrier unit by way of electromagnetic fields.

In this case, the information carrier units could communicate with one another directly by way of emitted electromagnetic fields. However, direct communication such as this by way of electromagnetic fields requires that the information carrier units are disposed relatively close together in relation to one another, in particular the information carrier unit provided in the cable portion in relation to the information carrier unit provided in the cable receiving unit.

An improvement in the communication can be achieved by the information carrier unit interacting with the at least one information carrier unit by way of parasitic electromagnetic fields produced in at least two electrical conductors of the cable portion.

The advantage of this solution can be seen in that the parasitic electromagnetic field coupling with at least two conductors of an inner body of the cable portion makes it possible to obtain an effective antenna range, in particular in the longitudinal direction of the cable portion, that is much greater than the antenna range of the antenna unit in undisturbed surroundings without a cable portion.

The coupling between the antenna unit of the information carrier unit and the read/write device can be set up particularly advantageously if the at least two electrical conductors of the inner body build up and emit the parasitic electromagnetic field in a frequency range predetermined by the antenna unit of the information carrier unit, the excitation taking place in the frequency range predetermined by the antenna unit of the information carrier unit, in which the antenna unit of the information carrier unit usually operates resonantly, in order to create optimum receiving and transmitting conditions on the part of the antenna unit of the information carrier unit. In particular, this also involves the frequency ranges of the antenna units of the information carrier units substantially coinciding.

In order to obtain a parasitic emission of the at least two electrical conductors, it is preferably provided that the at least two electrical conductors interact non-resonantly in the frequency range of the electromagnetic field, so that reception and emission on the part of the electrical conductors are possible.

It is preferably provided in this respect that the at least two electrical conductors behave in the manner of a dipole and the antenna unit can be coupled with the electrical conductors by the parasitic electromagnetic fields thereby forming.

The at least two electrical conductors can be used for producing a parasitic electromagnetic field particularly advantageously if the at least two electrical conductors of the inner body are galvanically isolated from one another, so that they do not act in the sense of a coil, but can behave in the manner of a multiwire line in no-load operation.

With regard to the run of the at least two electrical conductors in the inner body of the cable portion, no further details have been specified so far. An advantageous solution provides that the at least two electrical conductors run substantially at a constant spacing from one another in the inner body of the cable.

It is still more advantageous if the at least two electrical conductors run substantially parallel to one another.

In connection with the solution so far, it has merely been considered that there are at least two electrical conductors, building up a parasitic electromagnetic field.

However, it is particularly advantageous if the at least two electrical conductors are twisted with at least one further optical and/or electrical line or a number of further optical and/or electrical conductors, so that a cable portion of this kind can be used in conventional manner to the full extent.

In this respect, the at least two electrical conductors which are used for building up a parasitic electromagnetic field may be provided such that they are fully insulated in the inner body and not used for a customary cable function.

However, there is also the possibility of transmitting signals or power over the at least two electrical conductors, without thereby disturbing the buildup of a parasitic electrical field, since they lie in a frequency range which does not interfere with customary use of the electrical conductors in the cable.

For the interaction with a parasitic electromagnetic field of this kind, built up by the at least two electrical conductors, it is suitable if the antenna unit of the information carrier unit is formed as a dipole antenna.

Dipole antennas of this kind may in this case be aligned in various ways in the cable portion.

Advantageous coupling to the at least two electrical conductors is obtained if one component of the dipole radiation direction runs transversely to a twisting direction of the lines in the inner body, since optimum interaction between the dipole antenna and the at least two electrical conductors is possible as a result, in order to be able to interact optimally with the parasitic electromagnetic field.

A particularly advantageous exemplary embodiment provides that a multiplicity of information carrier units are disposed in the longitudinal direction of the cable portion, the information carrier units being disposed at a spacing from one another and each of these information carrier units having an antenna unit.

In this case, the information carrier units could be disposed at randomly varying distances from one another in the longitudinal direction of the cable portion.

In order to optimize the communication with the information carrier units, and in particular their position in relation to one another for the communication, it is preferably provided that the multiplicity of information carrier units are disposed at defined regular intervals in the longitudinal direction of the cable portion.

It is particularly advantageous in this respect if the defined regular intervals for the information carrier units predetermine a uniform distance between the information carrier units in the longitudinal direction of the cable portion, so that by finding one information carrier unit, the other information carrier units can also inevitably be located.

The information carrier units disposed at a spacing from one another in the longitudinal direction of the cable portion may in principle be operated in complete isolation from one another, so that each individual information carrier unit must be addressed by the read/write device, without the other information carrier units coming in question.

In particular, it is provided that the antenna unit of one of the information carrier units can be coupled with the antenna unit of another of the information carrier units by electromagnetic field coupling.

In this case, there is, for example, the possibility of further transmitting information from at least one of the information carrier units to the other of the information carrier units, if appropriate even likewise to further information carrier units, by the information being passed on from information carrier unit to information carrier unit.

An information transmission of this kind is easily possible for example if antenna units of the information carrier units respectively following one another in the longitudinal direction of the cable can be coupled with one another.

The coupling of the antenna units could primarily take place by the antenna units being disposed in relation to one another at the distance of the customary antenna range, that is to say the antenna range without any influence on the part of the surroundings. However, since the antenna ranges are not very great, this has the disadvantage that the information carrier units would have to be disposed at a lesser distance from one another.

It is therefore advantageous if the antenna units of the information carrier units can be coupled by way of parasitic electromagnetic field coupling over the at least two electrical conductor strands of the inner cable body. Parasitic electromagnetic field coupling of this kind allows an effective antenna range to be obtained that is much greater than the antenna range in the uninfluenced state.

It is particularly advantageous in this respect if, by the parasitic electromagnetic field coupling between the antenna unit and the at least two conductor strands, an effective antenna range of the antenna unit that is increased by a factor of more than two in comparison with an antenna range of the antenna unit that is uninfluenced by the surroundings can be obtained in the longitudinal direction of the cable.

It is particularly advantageous in this respect if the effective antenna range is increased by a factor of more than five, still better a factor of more than ten, in comparison with the uninfluenced antenna range.

In the case in which the individual antenna units in a cable according to the invention are to be operated in isolation and without interaction with one another, it is preferably provided, however, that the information carrier units are disposed at the defined regular intervals in relation to one another in such a way that the distances between the information carrier units correspond to at least 2 times an effective antenna range of the information carrier units in the direction of the respectively nearest information carrier units.

In particular, this also has the effect, when the information carrier units are addressed by the read/write device, of avoiding multiple reading-out by multiple information carrier units, and consequently misinterpretation of the data read out.

It is still better if the distances correspond to at least 2.5 times the effective antenna range of the information carrier units in the direction of the nearest information carrier unit.

With regard to the forming of the information carrier unit itself, no further details have been specified so far.

An advantageous embodiment provides that the information carrier unit comprises a base.

In this case, it is provided that an integrated circuit of the information carrier unit is disposed on the base.

Furthermore, it is suitably provided in this case that a conductor acting as an antenna unit is disposed on the base.

The antenna may in this case be produced from metallic conductor tracks, or be produced by a lacquer applied to the base. In the case of another embodiment, the antenna is applied to the base by a printing operation.

In the case of an advantageous exemplary embodiment of an information carrier unit according to the invention, the base is formed from a rigid, bending-resistant material, in which for example the antenna and the integrated circuit are embedded. For example, the base is formed by an embedding compound, which encloses the antenna unit and the integrated circuit and is formed as a disk-shaped, semilenticular or lenticular body.

An information carrier unit of this kind can thus be fitted at the respective location as a rigid body, in particular inserted with a positive fit.

When the base is formed in such a way, the information carrier unit is preferably formed such that the electromagnetic field for communication with the information carrier unit lies in the HF range.

As an alternative to this, it is provided that the base is made of a flexible material.

A flexible material of this kind could be, for example, a resiliently flexible material.

It is particularly advantageous, however, for assembling the information carrier unit with the base, if the flexible material is a so-called pliant material.

With regard to the structure of the information carrier units, no further details have been specified so far.

An advantageous solution provides that the information carrier unit has at least one memory, for example for the information that can be read out.

Such a memory could be formed in a very wide variety of ways. For example, the memory could be formed such that the information stored in it can be overwritten by the read/write device.

However, a particularly advantageous solution provides that the memory has a memory area in which items of information once written are stored such that they are write-protected.

Such a memory area is suitable, for example, for storing an identification code for the information carrier unit or other data specific to this information carrier unit, which can no longer be changed by any of the users.

Such a memory area is also suitable, however, for the cable manufacturer to store information which is not to be overwritten. Such information is, for example, cable data, cable specifications or else details of the type of cable and how it can be used.

However, these data may, for example, also be supplemented by data comprising details about the manufacture of this specific cable assembly or data representing test records from final testing of the cable assembly.

In addition, a memory according to the invention may also be formed furthermore in such a way that it has a memory area in which items of information are stored such that they are write-protected by an access code.

Such write-protected storage of information may, for example, comprise data which can be stored by a user. For example, after preparation of the cable assembly, a user could store in the memory area data concerning the preparation of the cable assembly or concerning the overall length of the cable portion or concerning the respective portions over the length of the cable portion, the user being provided for this purpose with an access code by the cable manufacturer, in order to store these data in the memory area.

A further advantageous embodiment provides that the memory has a memory area to which information can be freely written.

Such a memory area may, for example, receive information which is to be stored by the user in the cable receiving unit, for example concerning the type of installation or the preparation of the same.

In particular when a number of information carrier units are used, it would be conceivable, for example, for it to be possible for all the information carrier units to be addressed with one access code. However, this has the disadvantage that the information carrier units consequently cannot be selectively used, for example to assign different information to specific portions of the cable.

For this reason, it is advantageous if each of the information carrier units can be individually addressed by an access code.

In connection with the description so far of the information carrier units, it has just been assumed that they carry information which has been stored in the information carrier units by external read/write devices either before or during the production of the cable assembly or during the use of the cable assembly.

In order to be able to pass on information with the information carrier units, it is suitably provided in the case of an advantageous embodiment that the information carrier units receive and subsequently re-transmit information.

It is particularly advantageous in this respect if the information carrier units buffer-store the information, so that the transmission of the information can take place at an advantageous point in time.

A further advantageous solution provides that the at least one information carrier unit picks up measured values of an associated sensor, that is to say that the information carrier unit not only stores and makes available external information but is itself capable of acquiring information about the cable assembly, that is to say physical state variables of the cable assembly.

For example, it is provided that the sensor picks up at least one of the state variables such as physical radiation, temperature, tension, pressure, elongation or moisture.

A particularly advantageous solution provides that shear stresses in the cable portion or in the cable receiving unit can be picked up by the sensor.

With regard to the operation of the information carrier unit and the operation of the sensor from the information carrier unit, no further details have been specified so far. An advantageous solution provides that the information carrier unit reads out the sensor in the activated state.

This means that the information carrier unit has no power supply of its own, but has to be activated by an external energy supply.

One possibility for such activation is that the information carrier unit can be activated by a read/write device.

Another advantageous solution provides that the information carrier unit can be activated by an electromagnetic field of a current flowing through the cable portion.

An electromagnetic field of this kind can be achieved for example by a current for supplying power to items of equipment, the current flowing through the cable portion building up the electromagnetic field.

However, it is also conceivable to provide in the conductor strand dedicated lines which produce an electromagnetic field for supplying energy to the at least one information carrier unit or to the multiplicity of information carrier units.

With regard to the storing of the measured values, it is advantageous if the information carrier unit stores the measured values in a memory area of the memory.

Since, if the cable portion has a long service life, a multiplicity of measured values can be expected, and they would consequently require a very large memory to store them, to reduce the amount of data it is preferably provided that the information carrier unit only stores a measured value in the memory area if it exceeds a threshold value.

This may take place, for example, by the information carrier unit constantly picking up the measured values, but the information carrier unit being prescribed a threshold value as from which the measured values are stored, so that normal states are not stored but only the measured values which do not correspond to a normal state defined by the threshold value.

These measured values are then stored in the simplest case as nothing more than measured values, in somewhat more complex cases as measured values with an indication of the time at which they were picked up, or with an indication of other circumstances in which these measured values were picked up.

As an alternative to this, an advantageous solution provides that the information carrier unit only stores in the memory area measured values which lie outside a statistically determined normal measured value distribution.

With regard to the regions in which the state variables are determined by means of the sensor, no further details have been specified so far.

One advantageous solution provides that the sensor picks up at least one state variable of the cable receiving unit.

One advantageous solution provides that the sensor picks up at least one state variable of the inner body of the cable portion.

Another solution provides that the sensor picks up at least one state variable of the sheath of the cable portion.

A further solution provides that the sensor picks up at least one state variable between the inner body and the sheath.

In the case of a further embodiment, it is provided that both a sensor for state variables of the inner body and a sensor for state variables of the sheath are provided.

With regard to the type of sensor and the way in which it is formed, no further details have been specified so far.

An advantageous exemplary embodiment provides that the sensor is a sensor which reacts irreversibly to the state variable to be picked up.

A sensor of this kind has the advantage that it reacts irreversibly when the state variable occurs, so that it is not necessary for the sensor, and in particular the information carrier unit, to be active at the point in time of the occurrence of the state variable to be picked up or the occurrence of the deviation in the state variable to be picked up. Rather, the sensor is capable at all later points in time of generating a measured value which corresponds to the state variable that was achieved at some point in time in the past.

As an alternative to this, it is provided that the sensor is a sensor which reacts reversibly with regard to the state variable to be picked up. In this case, it is necessary to activate the sensor when the state variable to be picked up occurs or when there is a change in the state variable to be picked up, in order to be able to pick up the measured value corresponding to this state variable.

With regard to the communication of the information carrier unit by way of electromagnetic fields, no further details have been specified so far.

An advantageous solution provides that the at least one information carrier unit communicates with a read/write device.

A read/write device of this kind may be, for example, a mobile read/write device, which is in each case brought into the vicinity of the cable receiving unit by a user, in order to communicate directly with the information carrier unit in the cable receiving unit or else, if appropriate, with an information carrier unit in the cable portion.

However, this solution makes it necessary for the mobile read/write device always to be brought into a suitable position in relation to the information carrier unit.

Another advantageous solution therefore provides that, for the communication with the information carrier unit, the read/write device is disposed in a stationary manner on a device associated with the cable portion.

A stationary read/write device of this kind has the advantage that it does not have to be brought into a suitable position in relation to the information carrier unit in each case but is constantly in the position, and so merely has to be activated in order to communicate with the information carrier unit.

In particular, it is provided in the case of an advantageous solution that, for the communication with the information carrier unit, the read/write device is in a stationary association with a unit to be connected to the cable receiving unit.

The stationary association of the read/write device with the device to be connected to the cable receiving unit allows the geometrical conditions for the communication with the information carrier unit to be easily chosen such that communication with the information carrier unit is always possible when the read/write device is activated.

A solution that is particularly suitable in the case in question provides that the cable receiving unit is formed as a plug-in connector element and that, for the communication with the information carrier unit, the read/write device is associated with a mating plug-in connector element.

In this case, the association with the mating plug-in connector element could be spatially adequate.

Dependable communication between the read/write device, in particular an antenna unit of the same, and the information carrier unit can be realized when an antenna unit of the read/write device is associated with a base part of the mating plug-in connector element, so that, when the plug-in connector element and the mating plug-in connector element are connected, the spatial position between the information carrier unit in the plug-in connector element and the antenna unit in the mating plug-in connector element is defined with sufficient accuracy, and consequently the spatial association between the antenna unit and the information carrier unit that is required for satisfactory communication is always obtained.

It is particularly advantageous in this respect if the antenna unit is disposed on the base part. It is still more advantageous if the antenna unit of the read/write device is disposed in the base part, that is to say that the antenna unit is either disposed in a receptacle of the base part or else, for example, is integrated into the base part, that is to say is inserted or molded into it.

With regard to the function of the read/write device, it can in principle be assumed that the read/write device is capable of exchanging data with the information carrier unit.

However, it is at least required that the read/write device reads out data from at least one information carrier unit, it being possible for this data to comprise all the information described above by way of example.

The read/write device may thus be formed in such a way that it passes on the read-out data to further items of equipment.

As an alternative or in addition, however, the read/write device may be formed in an advantageous way such that it evaluates the data and generates control signals.

In this respect, a large number of extremely different control data may be evaluated and control signals generated.

For example, it is conceivable to provide that the read/write device verifies the correctness of the association of the cable receiving unit with the device.

Another advantageous solution provides that the read/write device verifies the correctness of the association of the cable assembly with the device.

Another advantageous embodiment provides that the read/write device verifies and indicates the correctness or incorrectness of the association, that is to say generates a control signal for the indication.

In this case, the read/write device may activate an indicating unit. However, it is also conceivable to form the read/write device in such a way that it is provided with an indicator.

An indicator of this kind may be, for example, an optical indicator or else an acoustic indicator, which can be used in the event of incorrectness of an association for optically and/or acoustically notifying a user of this.

If information carrier units are also provided in the cable portion, a further advantageous exemplary embodiment provides that the read/write device communicates with at least one information carrier unit in the cable portion, the communication with the information carrier unit in the cable portion preferably taking place in a non-contact manner, that is to say by way of electromagnetic fields.

In the case of this solution, it is conceivable for the read/write device to communicate directly with an information carrier unit in the cable portion by way of the electromagnetic field if the read/write device is disposed geometrically at a sufficiently small distance from the information carrier unit in the cable portion.

It is particularly advantageous, however, if the read/write device communicates with the at least one information carrier unit in the cable portion by way of the information carrier unit in the cable receiving unit, so that this provides the possibility, with the read/write device, of first setting up a communication with the information carrier unit in the cable receiving unit and then communicating by way of the information carrier unit in the cable receiving unit with the further information carrier units, in particular those in the cable portion.

A particularly advantageous solution provides that the information carrier units, that is to say in particular the number of information carrier units in the cable portion and also, for example, the information carrier unit in the cable receiving unit, form an information carrier network in which these information carrier units communicate with one another.

Communication of the information carrier units with one another preferably takes place in this case in such a way that the respective information carrier unit communicates with the respective nearest information carrier unit and the latter then again communicates with the information carrier unit that is nearest to it.

A particularly advantageous solution provides in this respect that the information carrier network is accessible by way of the read/write device, that is to say that the read/write device serves the purpose not only of reading out data from the information carrier units but also of providing access to the information carrier network.

It is suitably provided in this respect that the information carrier network is accessible by way of the information carrier unit in the cable receiving unit that communicates with the read/write device.

With regard to the way in which the cable receiving units are individually formed, no further details have been specified so far.

An advantageous solution provides that the cable receiving unit is formed as a line gland, in particular as a cable gland.

A line gland or cable gland of this kind may in this case be intended for mounting on the housing of an item of equipment or be part of the housing of a plug-in connector.

Another advantageous solution provides that the cable receiving unit is formed as a plug-in connector element.

In particular, it is provided in the case of a plug-in connector element of this kind that the plug-in connector element has a contact insert for establishing a connection with a corresponding contact insert of a corresponding plug-in connector element.

The contact insert is in this case preferably provided with plug-in contacts.

Further features and advantages of the invention are the subject of the following description and the pictorial representation of some exemplary embodiments.

BRIEF DESCRIPTION OF THE DRAWINGS

FIG. 7 shows a schematic block diagram of a fifth exemplary embodiment of the information carrier unit according to the invention;

FIG. 8 shows a representation of how the fifth exemplary embodiment of the information carrier unit according to the invention is realized;

FIG. 9 shows a representation of how a sixth exemplary embodiment of the information carrier unit according to the invention is realized;

FIG. 10 shows a view of the sixth exemplary embodiment of the information carrier unit according to the invention in the direction of the arrow A in FIG. 9;

DETAILED DESCRIPTION OF THE INVENTION

Figure 1:
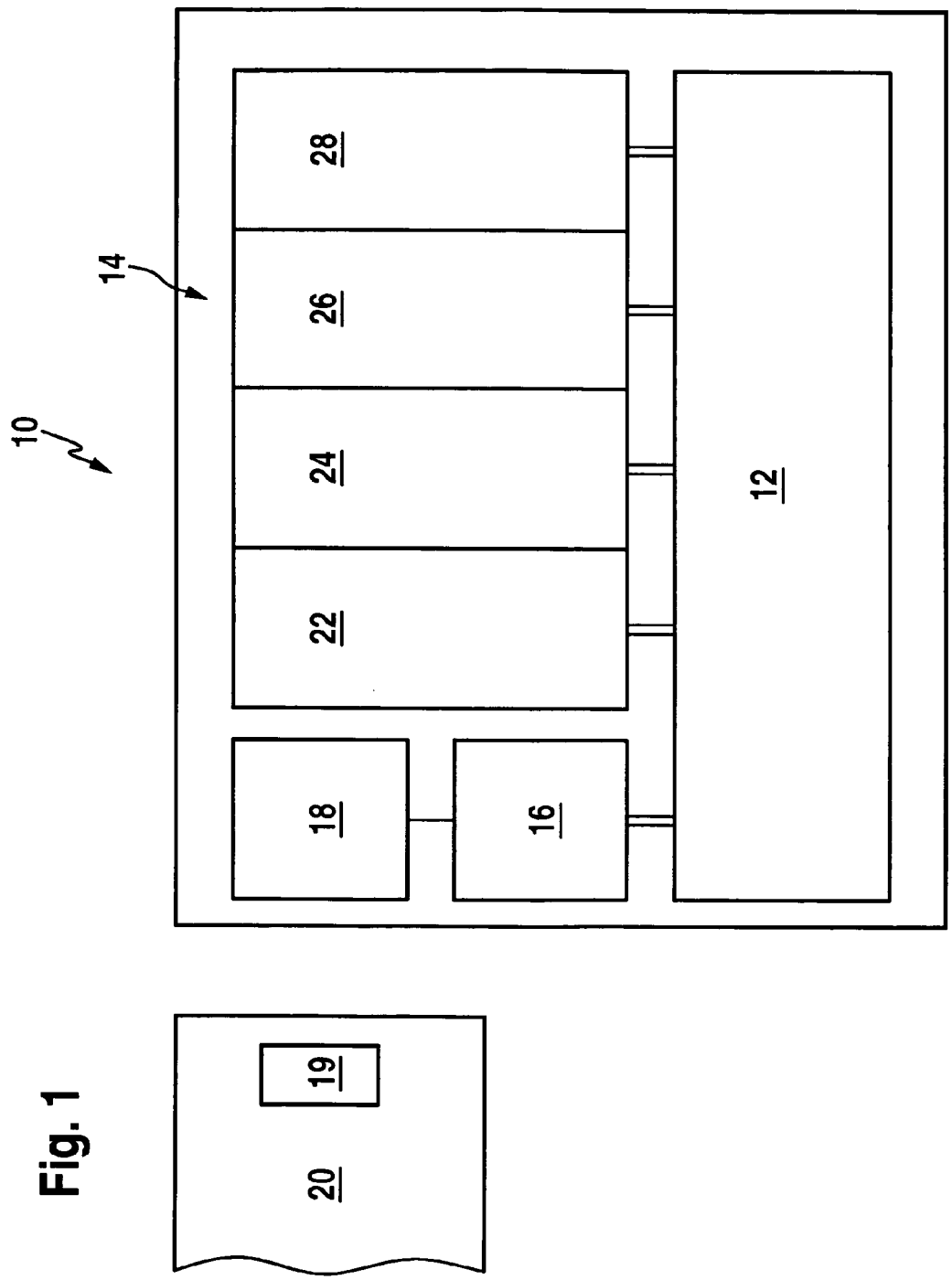
FIG. 1 shows a schematic block diagram of a first exemplary embodiment of an information carrier unit according to the invention.

A first exemplary embodiment of an information carrier unit 10 to be used according to the invention, represented in FIG. 1, comprises a processor 12, to which a memory designated as a whole by 14 is linked, the memory preferably being formed as an EEPROM.

Also connected to the processor 12 is an analog part 16, which interacts with an antenna unit 18.

When there is electromagnetic coupling of the antenna unit 18 to an antenna unit 19 of a stationary or mobile read/write device designated as a whole by 20, the analog part 16 is then capable on the one hand of generating, with the required power, the electrical operating voltage that is necessary for the operation of the processor 12 and the memory 14, as well as the analog part 16 itself, and on the other hand of making available to the processor 12 the information signals transmitted by electromagnetic field coupling at a carrier frequency or transmitting information signals generated by the processor 12 by way of the antenna unit 18 to the read/write device 20.

A very wide variety of carrier frequency ranges are possible thereby.

In an LF range of approximately 125 to approximately 135 kHz, the antenna unit 18 acts substantially as a second coil of a transformer that is formed by the antenna unit 18 and the antenna unit 19 of the read/write device 20, energy and information transmission taking place substantially by way of the magnetic field.

In this frequency range, the range between the antenna unit 19 and the antenna unit 18 is low, that is to say that, for example, the mobile read/write device 20 with the antenna unit 19 must be brought up very close to the antenna unit 18, to within less than 10 cm.

In an HF range between approximately 13 and approximately 14 MHz, the antenna unit 18 likewise acts substantially as a coil, good energy transmission with a sufficiently great range being possible as before in the interaction between the antenna unit 18 and the antenna unit 19 of the read/write device 20, the distance being, for example, less than 20 cm.

In the UHF range, the antenna unit 18 is formed as a dipole antenna, so that, when the power supply to the information carrier unit 10 does not take place by way of the read/write device 20, a great range in the communication with the antenna unit 19 of the read/write device 20 can be realized, for example up to 3 m, the interaction between the read/write device 20 and the antenna unit 18 taking place by way of electromagnetic fields. The carrier frequencies are from approximately 850 to approximately 950 MHz or from approximately 2 to approximately 3 GHz or from approximately 5 to approximately 6 GHz. When the power is supplied by the, for example mobile, read/write device 20, the communication range is up to 50 cm.

Depending on the frequency range, therefore, the antenna units 18 are also differently formed. In the LF range, the antenna unit 18 is formed as a compact, for example wound, coil with an extent which may even be less than one square centimeter.

In the HF range, the antenna unit 18 is likewise formed as a flat coil, which may also have a greater extent of the order of several square centimeters.

In the UHF range, the antenna unit 18 is formed as a dipole antenna of diverse configurations.

The memory 14 interacting with the processor 12 is preferably divided into a number of memory areas 22 to 28, which can be written to in various ways.

For example, the memory area 22 is provided as a memory area which can be written to by the manufacturer and, for example, carries an identification code for the information carrier unit 10. This identification code is written in the memory area 22 by the manufacturer, and at the same time the memory area 22 is write-protected.

The memory area 24 can, for example, be provided with write protection which can be activated by the manufacturer of a cable assembly, so that the manufacturer has the possibility of writing to the memory area 24 and securing the information in the memory area 24 by write protection. In this way, the processor 12 has the possibility of reading and outputting the information present in the memory area 24, but the information in the memory area 24 can no longer be overwritten by third parties.

For example, the information stored in the memory area 24 may be information concerning the kind or type of cable and/or technical specifications of the cable assembly.

In the memory area 26, information is stored, for example, by the purchaser of the cable assembly and write-protected. Here there is the possibility for the purchaser and user of the cable assembly to store information concerning the installation and possibilities for use of the cable assembly and secure it by write protection.

In the memory area 28, information can be freely written and freely read, so that this memory area can be used for storing and reading information during the use of the information carrier unit in conjunction with the cable assembly.

The first exemplary embodiment of the information carrier unit 10 represented in FIG. 1 as a block diagram is a so-called passive information carrier unit, and consequently does not require an energy store, in particular an accumulator or battery, in order to be able to interact temporarily and exchange information with the read/write device 20.

Figure 2:
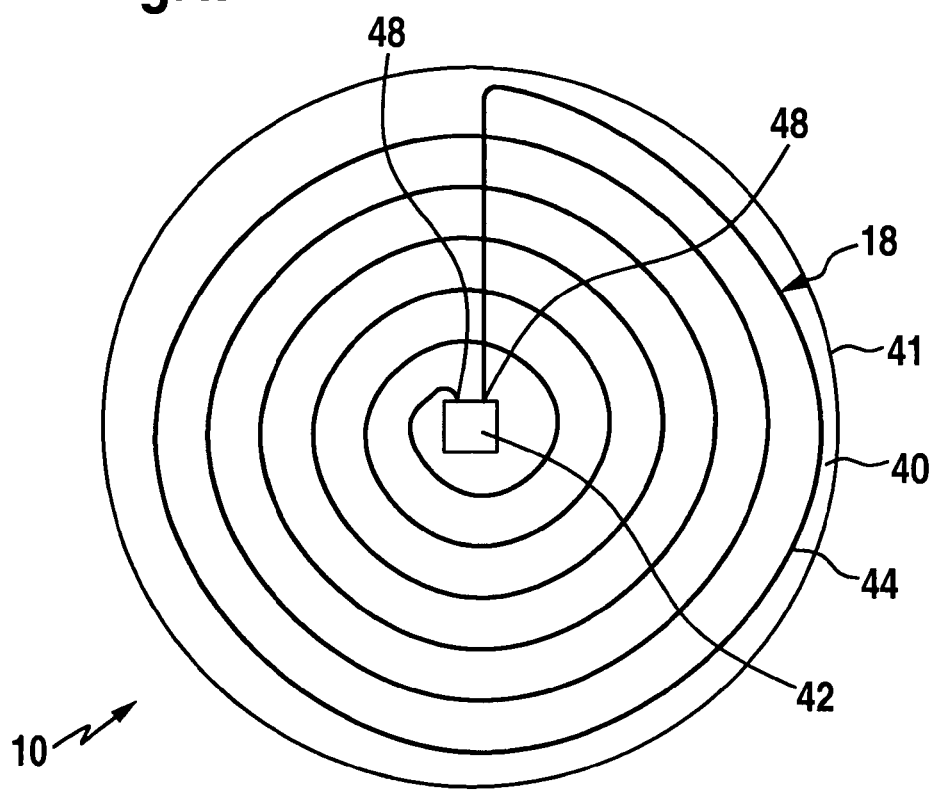
FIG. 2 shows a representation of how the first exemplary embodiment of the information carrier unit according to the invention is realized.

A way of realizing the first exemplary embodiment of the information carrier unit 10 according to the invention that is represented in FIG. 2 comprises a base 40, disposed on which is an integrated circuit 42, which has the processor 12, the memory 14 and the analog part 16, as well as conductor tracks 44, on the base 40, which form the antenna unit 18. The conductor tracks 44 may in this case be applied to the base 40 by means of any desired form-selective coating processes, for example in the form of printing-on a conductive lacquer or a conductive paste or etched metal structures or else in the form of a wire loop.

The base 40 is produced for example from a flexible material, for example a plastics strip, to which on the one hand the conductor track 44 can be easily and permanently applied by coating and on the other hand the integrated circuit 42 can also be easily fixed, in particular in such a way that a permanent electrical connection can be realized between outer connecting points 48 of the integrated circuit 42 and the conductor tracks 44.

If the base 40 is formed as flat material, it is of advantage if it is formed with edge regions 41 with a blunt effect on their surroundings, in order to avoid damage to the surroundings of the base 40. This means in the case of a base 40 formed from a thin flat material that it has, for example, rounded corner regions and, if possible, also edges with a blunt effect, for example deburred edges.

Figure 3:
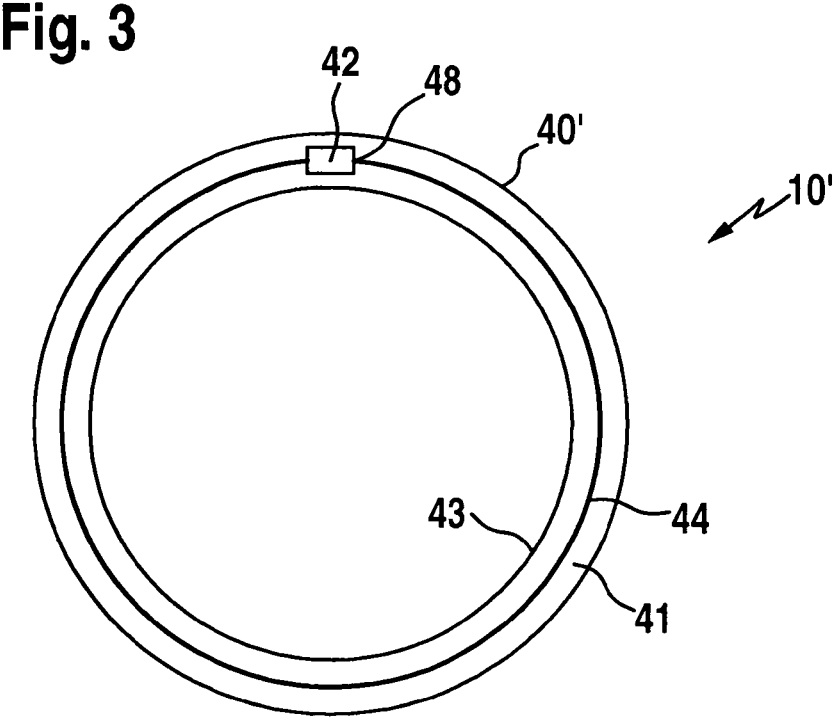
FIG. 3 shows a representation of how a second exemplary embodiment of the information carrier unit according to the invention is realized.

In the case of a second exemplary embodiment 10' of an information carrier unit according to the invention in FIG. 3, the base 40' is formed from an annular flat piece of material, on which the integrated circuit 42 is disposed and on which the conductor track 44 runs as a single or multiple coil winding.

Consequently, the second exemplary embodiment 10' can be used in applications in which an element is intended to be brought through a central aperture 43 in the annular flat material.

Figure 4:
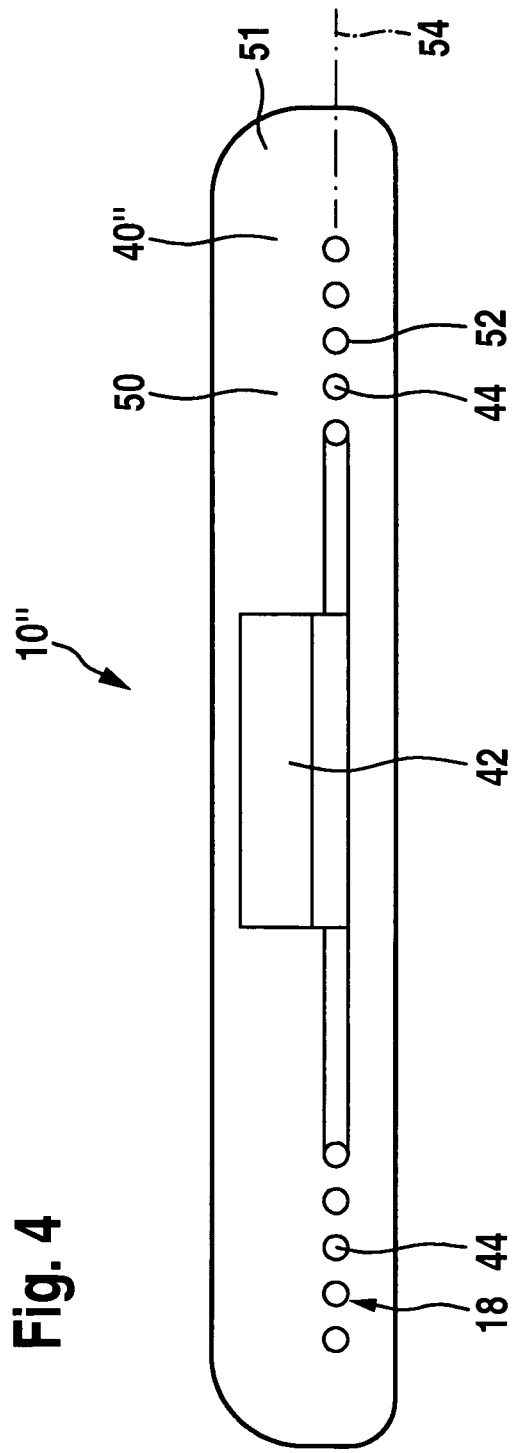
FIG. 4 shows a representation of how a third exemplary embodiment of the information carrier unit according to the invention is realized.

In the case of a third exemplary embodiment, represented in FIG. 4, the information carrier unit 10" is formed as an insertable disk-shaped rigid body.

The base 40" is in this case formed by an embedding compound forming an embedding body 50, for example of resin or plastics material, in which the integrated circuit 42 and the conductor tracks 44, which form the antenna unit 18, are embedded, the conductor tracks 44 forming annular coil windings 52, for example, which lie in a plane 54 and are completely embedded in the embedding body 50.

The embedding body 50 is provided with edge regions 51 with a blunt effect on their surroundings, which cannot cause any damage because of their rounding, thereby forming a lenticular cross-sectional shape.

In this case, the embedding body 50 may have a disk-like shape with rounded edge regions 51, a lenticular shape or a semilenticular shape.

In the case of this exemplary embodiment, the antenna unit 18 is intended for example for the LF or HF range, in which the antenna unit 18 operates in a way similar to a second coil of a transformer.

Figure 5:
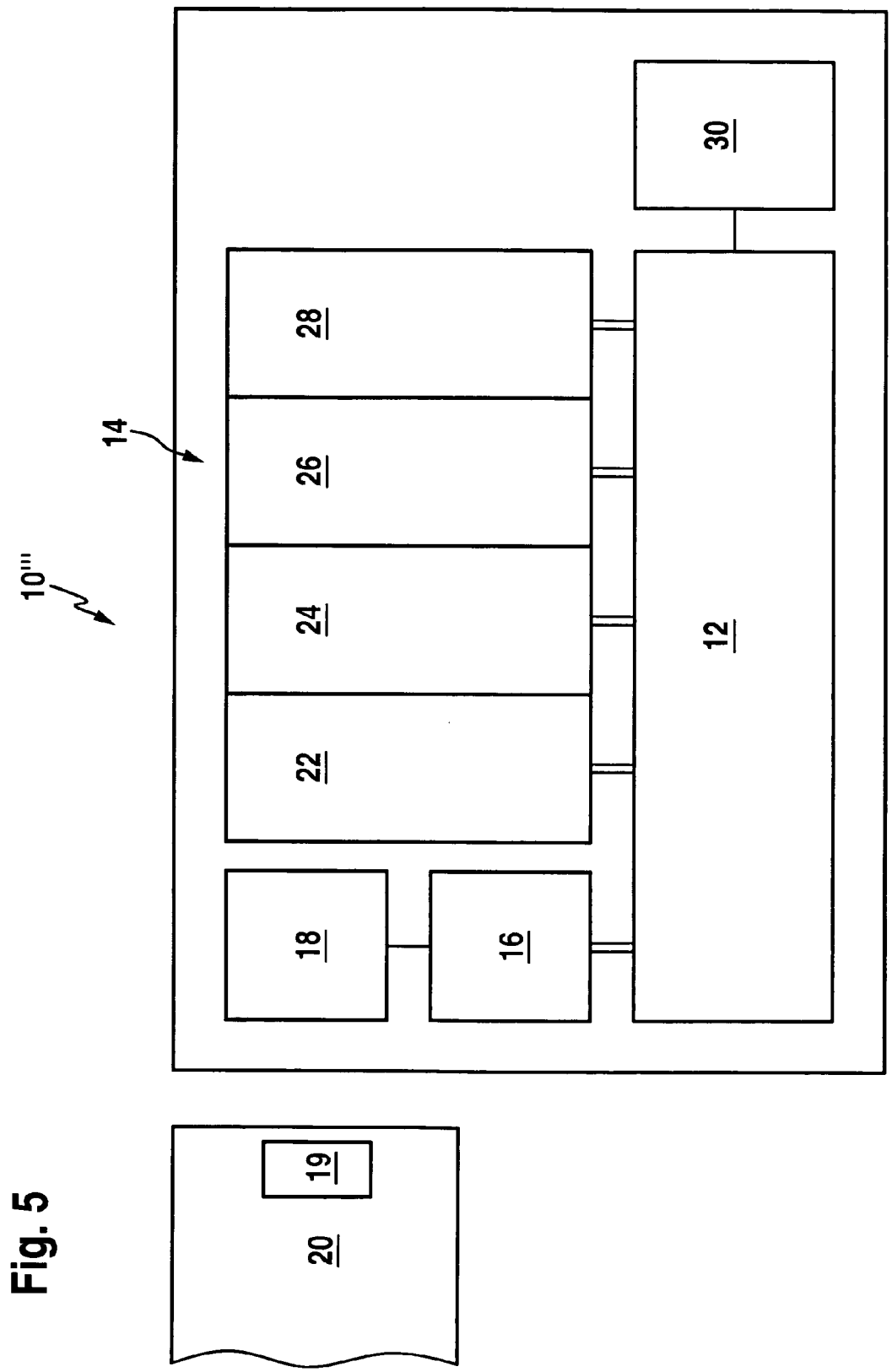
FIG. 5 shows a schematic block diagram of a fourth exemplary embodiment of an information carrier unit according to the invention.

In the case of a fourth exemplary embodiment of an information carrier unit 10''' according to the invention, represented in FIG. 5, those elements that are identical to those of the first exemplary embodiment are provided with the same reference numerals, so that, with regard to the description of the same, reference can be made to the first exemplary embodiment in its entirety.

By contrast with the first, second and third exemplary embodiments, in the case of the fourth exemplary embodiment 10''', a sensor 30 is also associated with the processor 12, enabling the processor 12 to pick up physical variables, such as for example radiation, temperature, pressure, tension, elongation or moisture, and for example store corresponding values in the memory area 28.

The sensor 30 may in this case be formed in accordance with the field of use.

For example, it is conceivable to form the sensor 30, for measuring a pressure, as a pressure-sensitive layer, it being possible for the pressure sensitivity to take place for example by way of a resistance measurement or, in the case of multiple layers, a capacitive measurement.

As an alternative to this, it is, for example, conceivable, for forming the sensor as a temperature sensor, to form the sensor as a resistor that is variable with the temperature, so that a temperature measurement is possible by a resistance measurement or by means of a temperature-sensitive electronic circuit.

If the sensor is formed as a tension or elongation sensor, the sensor is formed, for example, as a strain gage, which changes its electrical resistance in accordance with elongation. To increase the sensitivity and to compensate for disturbance variables, a measuring bridge may also be used.

If, however, the sensor is formed as a sensor reacting irreversibly to a specific elongation or to a specific tension, it is likewise possible to form the sensor as a sensor breaking an electrical connection, for example as a wire or conductor track for which the electrical connection is interrupted as from a specific tension or from a specific elongation, by rupturing at a predetermined breaking point or by tearing, or goes over from a low to a high finite resistance.

If appropriate, however, the compression measurement or the elongation measurement could also be realized by a capacitive measurement.

In the case of a moisture sensor, the sensor is preferably formed as a multilayer structure which changes its electrical resistance or its capacitance in accordance with moisture.

Otherwise, the fourth exemplary embodiment according to FIG. 5 operates in the same way as the first exemplary embodiment.

The sensor 30 is active, for example, whenever the information carrier unit 10''' is activated by the read/write device 20, so that sufficient power is available to operate the sensor 30 also.

During the activation of the information carrier unit 10''', the sensor 30 is consequently capable of transmitting measured values to the processor 12, which then stores these measured values for example in the memory area 28 and reads them out whenever they are requested by the read/write device 20.

Figure 6:
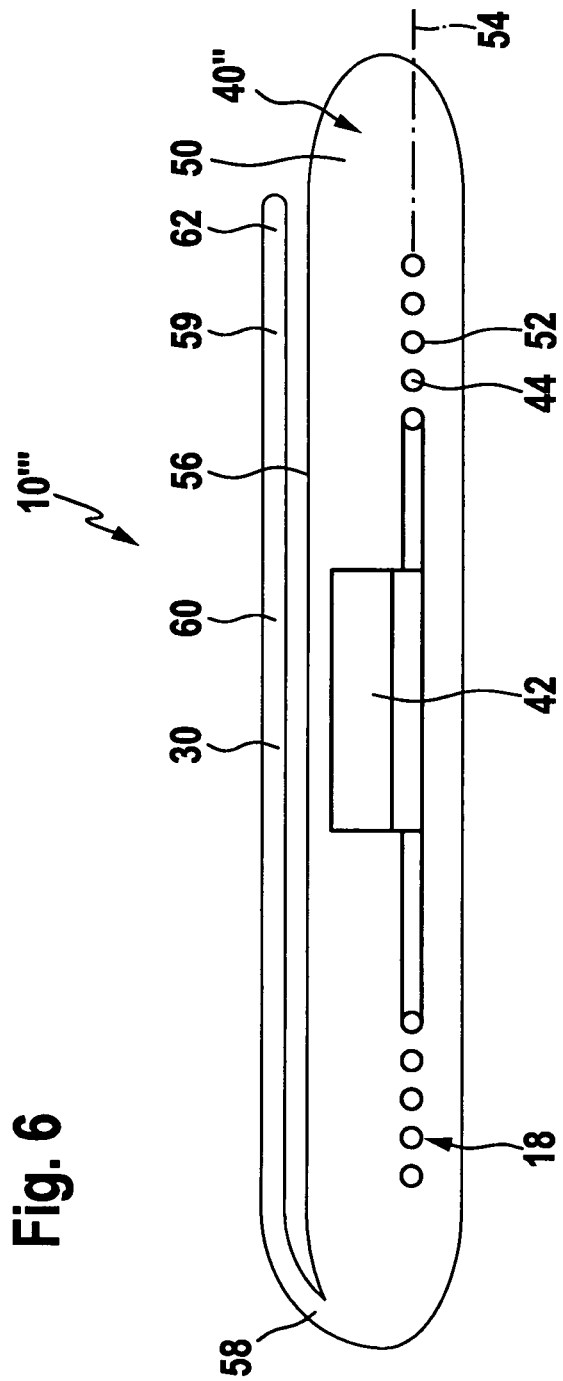
FIG. 6 shows a representation of how the fourth exemplary embodiment of the information carrier unit according to the invention is realized.

A way of realizing the fourth exemplary embodiment of the information carrier unit 10''' according to the invention that is represented in FIG. 6 comprises, as in the case of the third exemplary embodiment according to FIG. 4, that the integrated circuit 42, which has the processor 12, the memory 14 and the analog part 16, as well as conductor tracks 44, which form the antenna unit 18, are embedded in the base 40".

Also disposed on a side 56 of the embedding body 50 opposite from the coil 52 is the sensor 30 in the form of a sensor vane 59, which is held on a side 58 of the embedding body 50 and otherwise extends freely away therefrom, and which in the case of this exemplary embodiment comprises for example a strain gage 60, which can be fixedly connected by way of an end 62 opposite from the side 58 to an element of a cable assembly which is movable relative to the embedding body 50, and makes it possible to pick up tensile forces.

By contrast with the previous exemplary embodiments, in the case of a fifth exemplary embodiment of an information carrier unit 10'''' according to the invention, represented in FIG. 7, an antenna unit 18' is associated with the analog part 16, the antenna unit being divided in two, to be specific has for example an antenna part 18a, which communicates in the usual way with the antenna unit 19 of the read/write device 20, and an antenna part 18b, which is capable of coupling to an alternating magnetic field 31 and drawing energy from it, in order to operate the information carrier unit 10 independently of the read/write device 20, under some circumstances far away from it, with this energy drawn from the alternating magnetic field 31.

For example, the alternating electromagnetic field 31 can be produced by the leakage field of a data line, a control line, a pulsed power line or an alternating current line which is connected, for example, to an AC voltage source with 50 Hz or a higher frequency. It is in this way possible to supply the information carrier unit 10'''' with energy as long as the alternating field 31 exists, irrespective of whether the read/write device 20 is intended to be used for writing or reading information.

The frequency of the alternating field 31 and a resonant frequency of the antenna part 18b can be made to match each other in such a way that the antenna part 18b is operated in resonance, and consequently allows optimum coupling-in of energy from the alternating field 31.

Supplying the information carrier unit 10'''' with electrical energy in such a way, independently of the read/write device 20, is useful in particular if the sensor 30 is intended to be used over relatively long time periods for picking up a physical state variable which is not intended to coincide with the time period during which the read/write device 20 is coupled to the antenna unit 18a but to be independent of it.

Consequently, for example, the information carrier unit 10'''' can be activated by switching on the alternating electromagnetic field 31, so that physical state variables can be measured by the sensor 30 and picked up by way of the processor 12, and for example stored in the memory area 28, independently of the fact of whether or not the read/write device 20 is coupled with the antenna unit 18.

With an information carrier unit 10'''' of this kind, there is the possibility of carrying out measurements with the sensor 30 over long time periods, so that also a multiplicity of measured values arise, which leads to a large amount of data if all the measured values are stored.

For this reason, a selection of the measured values is made by the processor 12 on the basis of at least one selection criterion in order to reduce the amount of data in the memory area 28.

One selection criterion is, for example, a threshold value, a measured value being stored if the threshhold value is exceeded, so that in this way the amount of data is drastically reduced.

Another selection criterion may also be a statistical distribution, so that only measured values which deviate significantly from a previously determined statistical distribution are stored, and consequently the amount of data is also reduced by this.

A way of realizing the fifth exemplary embodiment of the information carrier unit 10'''' that is represented in FIG. 8 comprises a base 40, which is formed in the same way as in the case of the first or fourth exemplary embodiment.

Also disposed on the base 40 are the integrated circuit 42 with the conductor tracks 44a, which in the case of this exemplary embodiment form the antenna part 18a that is formed as a dipole antenna 70 for the communication with the read/write device 20 in the UHF range, while conductor tracks 44b form a coil, which represents the antenna part 18b that draws, at lower frequencies, from the alternating electromagnetic fields 31, the energy for operating the information carrier unit 10''''.

The conductor tracks 44a of the dipole antenna 70 preferably extend in a first direction 72 and have dipole radiation directions 74, which are aligned radially to the first direction 72 and in the direction of which an emission of an electromagnetic field primarily takes place.

Also disposed on the base 40 is the sensor 30 in the form of a multilayer structure 76 disposed next to the dipole antenna 70, which in the case of this exemplary embodiment is, for example, a space-saving capacitive moisture sensor, so that the sensor 30 may likewise be disposed either directly next to the integrated circuit 42 or be part of the integrated circuit 42.

On account of its state-dependent capacitance, the capacitive sensor 30 of the fifth exemplary embodiment may, as an alternative to the moisture sensor, also be formed as a temperature sensor or a pressure sensor.

A way of realizing a sixth exemplary embodiment of the information carrier unit 10'''' that is represented in FIGS. 9 and 10 comprises a base 40, which is formed in the same way as in the case of the first and fifth exemplary embodiments.

Also disposed on the base 40 are the integrated circuit 42 and the conductor tracks 44a and 44b, the conductor tracks 44a in the case of this exemplary embodiment forming a folded dipole antenna 70'.

In the case of this exemplary embodiment, the sensor 30 is formed as a strain gage 60, which in the case of this exemplary embodiment is disposed on a substrate 64 which is connected to the base 40 and can be elongated in a longitudinal direction 66 of the strain gage 60.

In the case of this information carrier unit 10'''', consequently, as long as the strain gage 60 is fixedly connected to a component part of a cable portion of a cable assembly that is intended to undergo elongation, elongations in the longitudinal direction 66 of the strain gage can be measured and can be stored by the processor 12 on the integrated circuit 42.

The exemplary embodiments explained above of information carrier units 10 to 10'''' can be used in the case of various kinds of cable assemblies and various kinds of cable receiving units, as described below on the basis of some exemplary embodiments.

Figure 11:
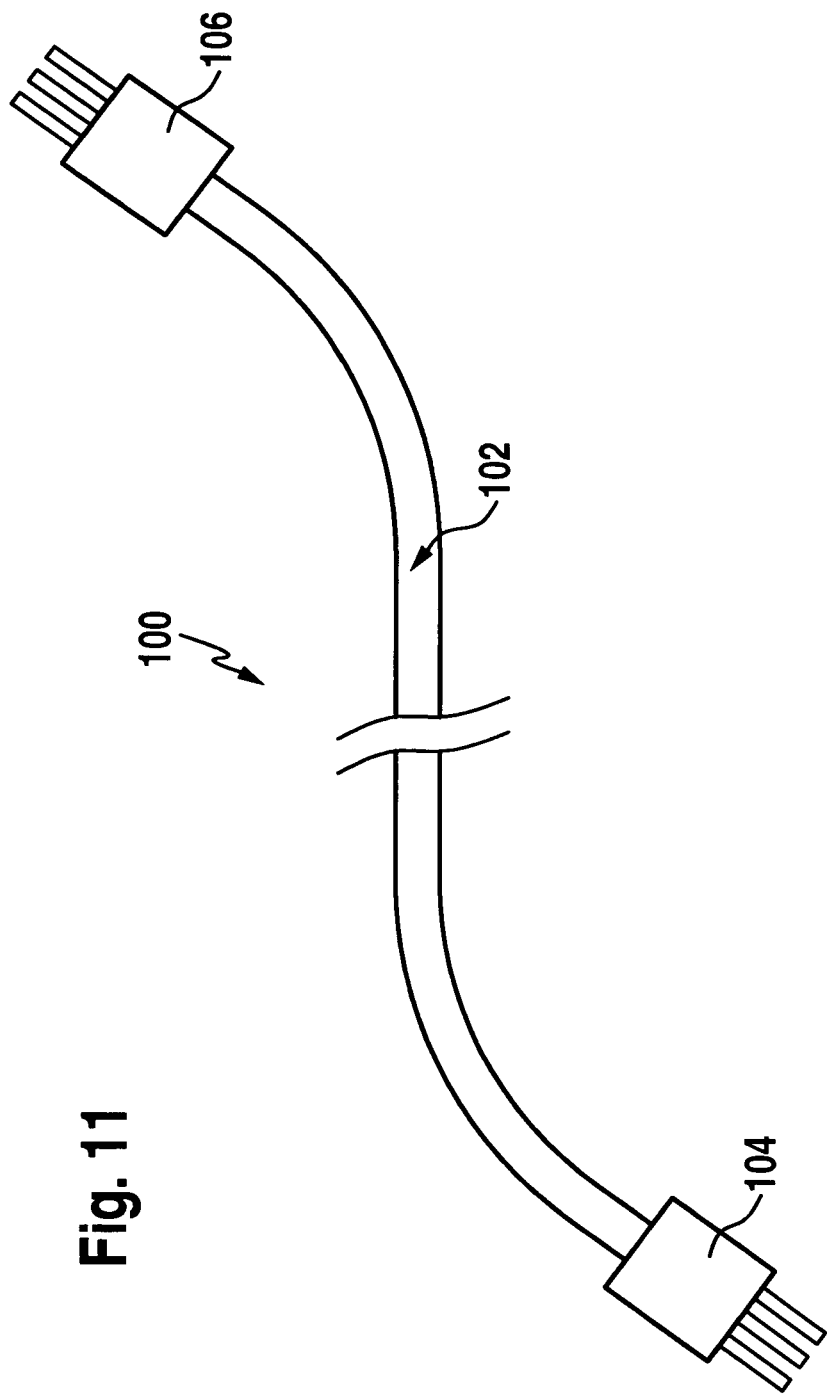
FIG. 11 shows a perspective representation of a first exemplary embodiment of a cable assembly according to the invention.

A first exemplary embodiment of a cable assembly 100 according to the invention, represented in FIG. 11, comprises a cable portion 102 and cable receiving units 104 and 106, which are for example located at the ends of said cable portion 102 and together with it form the cable assembly 100.

Figure 12:
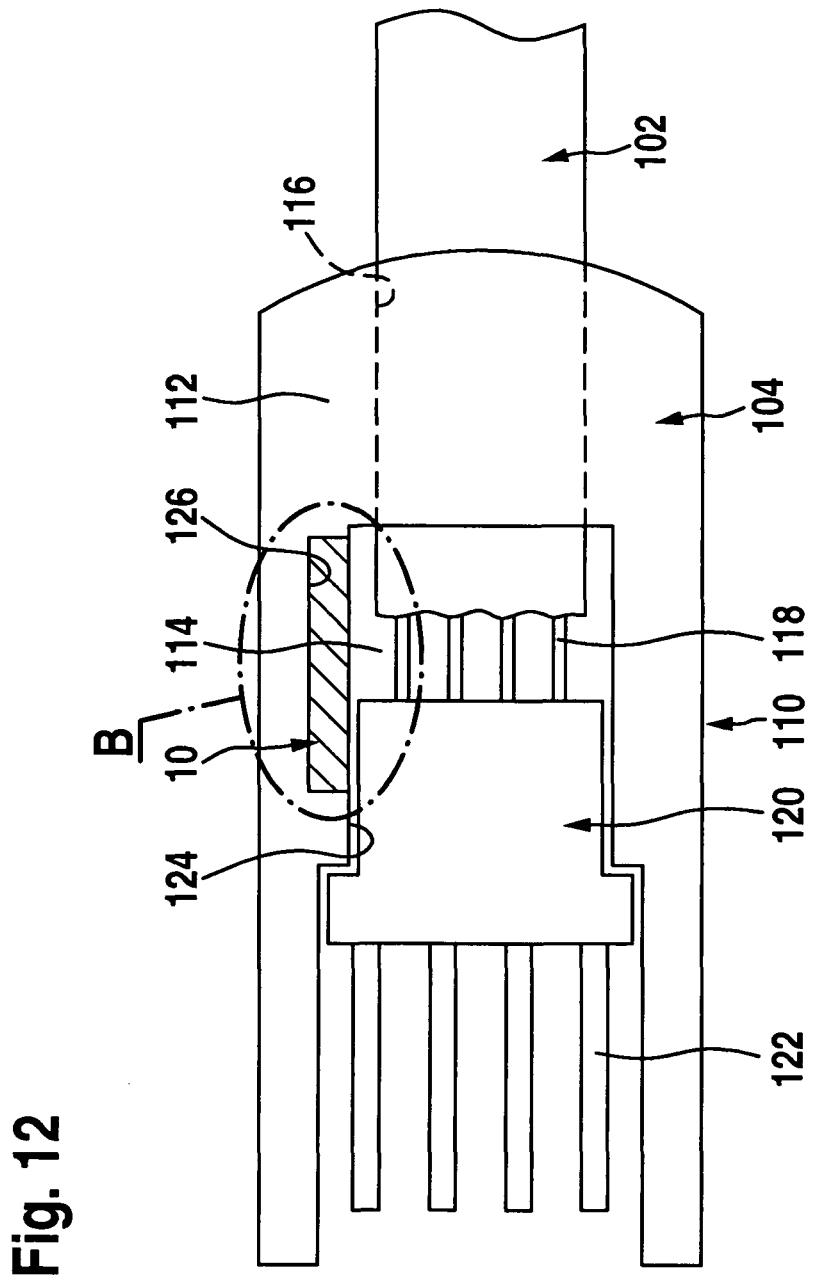
FIG. 12 shows a section through a first exemplary embodiment of a plug-in connector element for the first exemplary embodiment of a cable assembly according to the invention.
Figure 13:
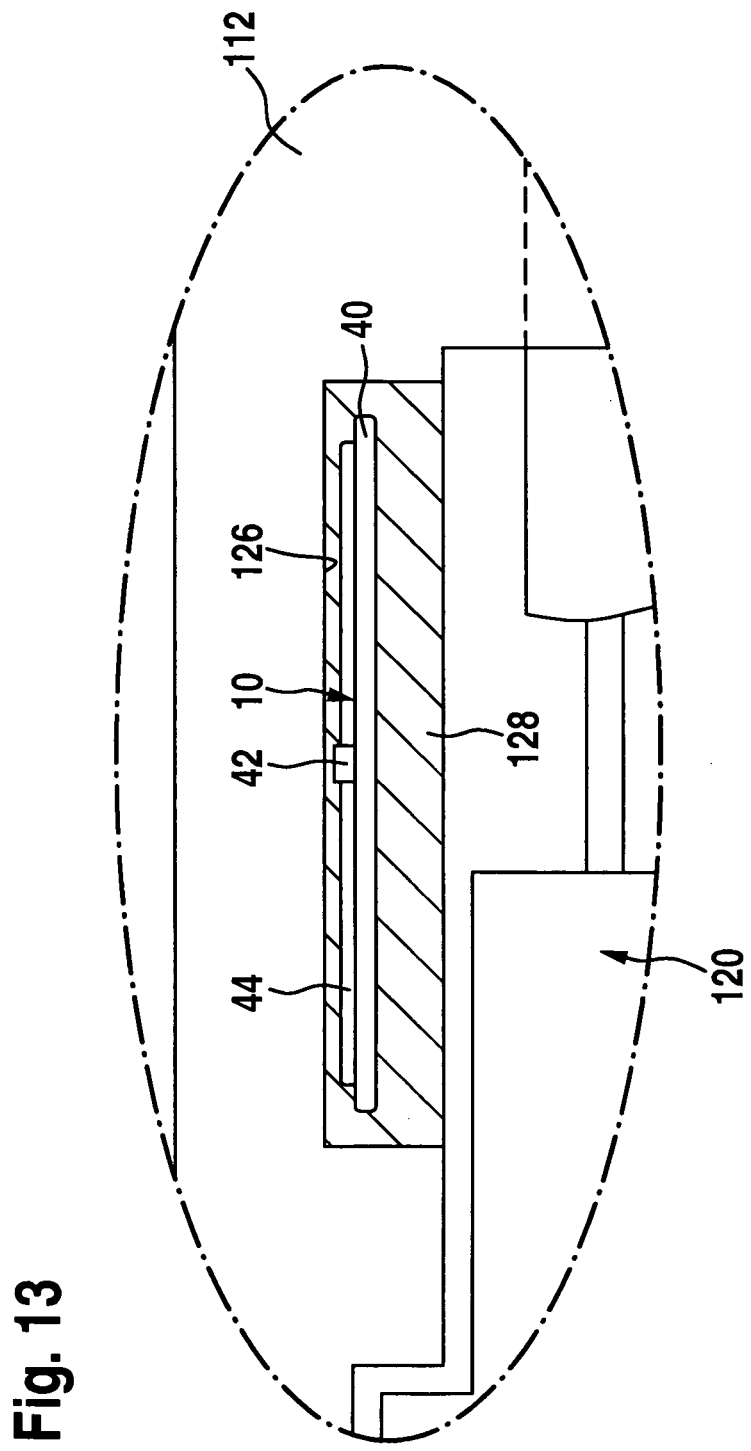
FIG. 13 shows an enlarged section in the region B in FIG. 12.

As represented for example in FIGS. 12 and 13, the cable receiving unit 104 is formed as a plug-in connector element 110 and comprises as a base part an outer housing 112, which encloses an inner space 114, into which the conductor strand 102 can be inserted from one side by way of an insertion opening 116, in order for example to connect individual conductors 118 in an electrically conducting manner to contact elements 122 held by a contact insert 120.

The contact insert 120 can in this case be inserted into a receptacle 124 in the outer housing 112 that is opposite from the insertion opening 116 and is likewise disposed to one side of the inner space 114, and can be fixed in a very wide variety of ways.

In the case of the first exemplary embodiment of the cable assembly 100 according to the invention, the plug-in connector element 110 is provided with an information carrier unit 10, for example according to the first exemplary embodiment, the outer housing 112 having for this purpose on a side facing the inner space 114 a recess 126, into which the information carrier unit 10 with the base 40 and the integrated circuit 42 disposed on the latter are placed together with the conductor tracks 44 and embedded by means of a casting compound 128, the casting compound 128 substantially filling the recess 126, and consequently completely embedding and enclosing not only the base 40 but also the integrated circuit 42 and the conductor tracks 44, so that the information carrier unit 10 is accommodated in the outer housing 112 in a hermetically sealed and protected manner.

In the case of this first exemplary embodiment, the information carrier unit 10 carries, for example, information concerning the cable assembly 100, specifying for example how the individual contact elements 122 are connected to the individual conductors 118, in which pattern the contact elements 122 are disposed in the contact insert 120 and also, for example, information on how the individual conductors 118 are dimensioned.

There is, however, also the possibility of storing in the information carrier unit 10, for example, test records concerning the measurement of the finished cable assembly 100 after its production, so that precise data on the rating of the connections between the conductors 118 and the individual contact elements 122 as well as on the capacity of the conductors 118 can be stored, in particular if it is a cable assembly that has to meet extremely high requirements.

However, there is likewise also the possibility of storing in the information carrier unit 10 information concerning how the cable assembly 110 can be used, that is to say its resistance to environmental influences and ambient conditions or even its service life under various ambient conditions or ambient influences.

Disposing the information carrier unit 10 according to the invention in a recess 126 in the outer housing 112 that is open toward the inner space 114 has the advantage that the information carrier unit 10 is in this way optimally protected from external effects, in particular also from mechanical effects such as the effects of impact or shock.

However, being disposed in this way entails the problem that the information carrier unit 10 can only be operated in all the frequency ranges described at the beginning if the outer housing is made of a non-shielding material, for example plastics.

If the outer housing 112 is made of thin metal, an information carrier unit 10 comprising an antenna unit 18 that operates in the LF range can be used.

Figure 14:
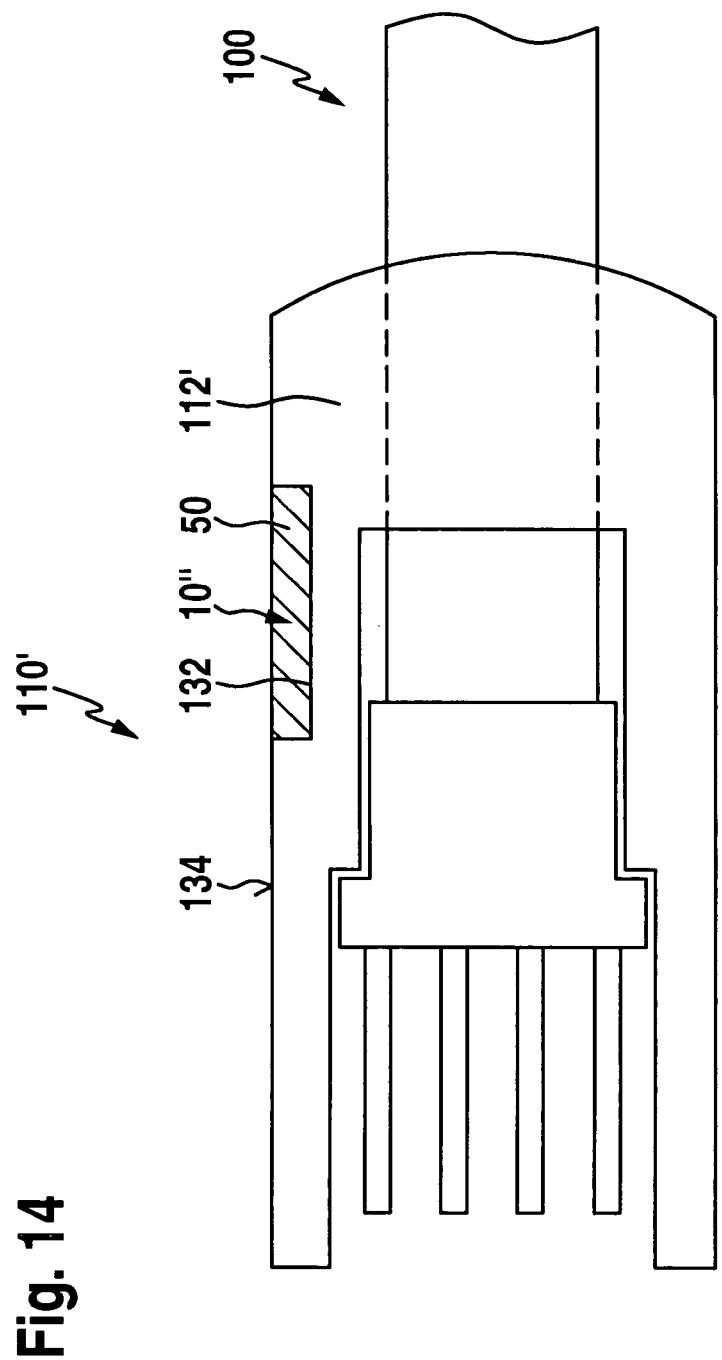
FIG. 14 shows a section through a second exemplary embodiment of a plug-in connector element for the first exemplary embodiment of a cable assembly according to the invention.

For this reason, in the case of a second exemplary embodiment of a cable assembly 100 according to the invention in FIG. 14, the information carrier unit in the form of the third exemplary embodiment 10" is inserted into a recess 132 in the outer housing 112' that extends from an outer wall 134 of the outer housing 112' into the latter.

For example, the embedding body 50 is in this case formed in such a way that it fills the recess 132 substantially positively and finishes substantially flush with the outer wall 134, so that there is no change whatever in the outer contour of the plug-in connector element 110' and, moreover, even when the cable assembly 100 has already been fitted to the plug-in connector element 110', the information carrier unit 10" can be easily inserted subsequently into the recess 132.

Depending on the configuration of the cable assembly 100, this solution allows, for example, in the case of a completely ready-prepared cable assembly 100, an information carrier unit 10" to be inserted or not inserted into the plug-in connector element 110' or, if appropriate, the information carrier unit 10" also to be provided in advance with information, written for example to a device provided for the purpose, before insertion into the recess 132 in the outer housing 112', so that the cable assembly 100' is already completely formed when the information carrier unit 10" is inserted into the recess 132.

Furthermore, this solution also has the advantage that shielding effects of an outer housing 112' produced from metal can be avoided by the recess 132 being disposed such that it extends from the outer wall 134 into the outer housing 112', so that the information carrier unit 10" in the case of the second exemplary embodiment of the cable assembly 100 according to the invention does not necessarily have to be operated in the LF range, but in particular can be operated in the HF range if the HF antenna is protected from the effects of the metal by suitable field shielding measures.

Moreover, the information carrier unit 10" in the case of the second exemplary embodiment of the cable assembly 100 according to the invention can carry the same information as described in connection with the first exemplary embodiment, so that overall, with regard to those parts which have the same reference numerals as those of the first exemplary embodiment, reference is made to the statements made about the first exemplary embodiment in their entirety.

Figure 15:
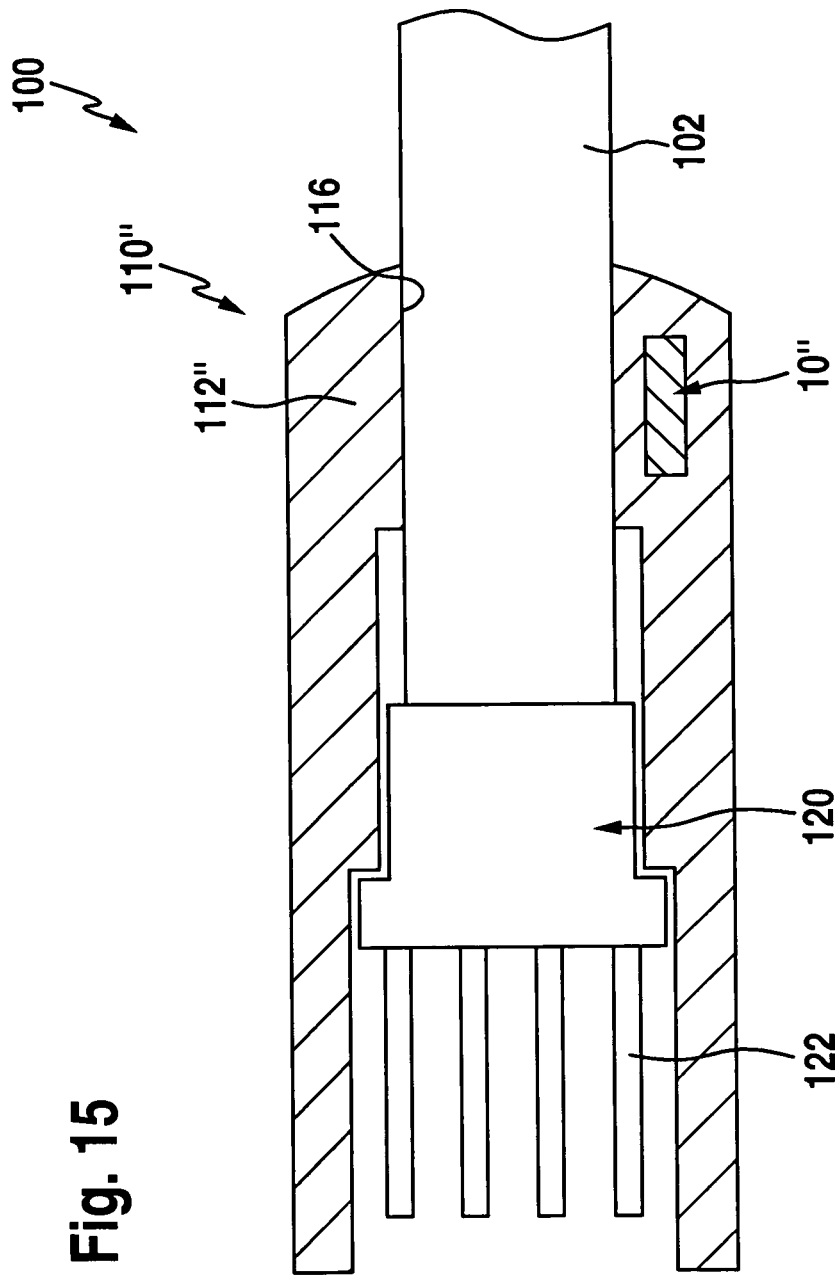
FIG. 15 shows a section through a third exemplary embodiment of a plug-in connector element for the first exemplary embodiment of a cable assembly according to the invention.

In the case of a third exemplary embodiment of a cable assembly 100 according to the invention, represented in FIG. 15, an identification unit 10" according to the invention as provided by the third exemplary embodiment is embedded in the outer housing 112", so that the embedding body 50 is completely enclosed by the material of the outer housing 112".

The outer housing 112" is in this case preferably formed as a plastics housing, in particular as a plastics injection molding, so that the embedding body 50 can be placed in the injection mold during the molding of the outer housing 112".

Figure 16:
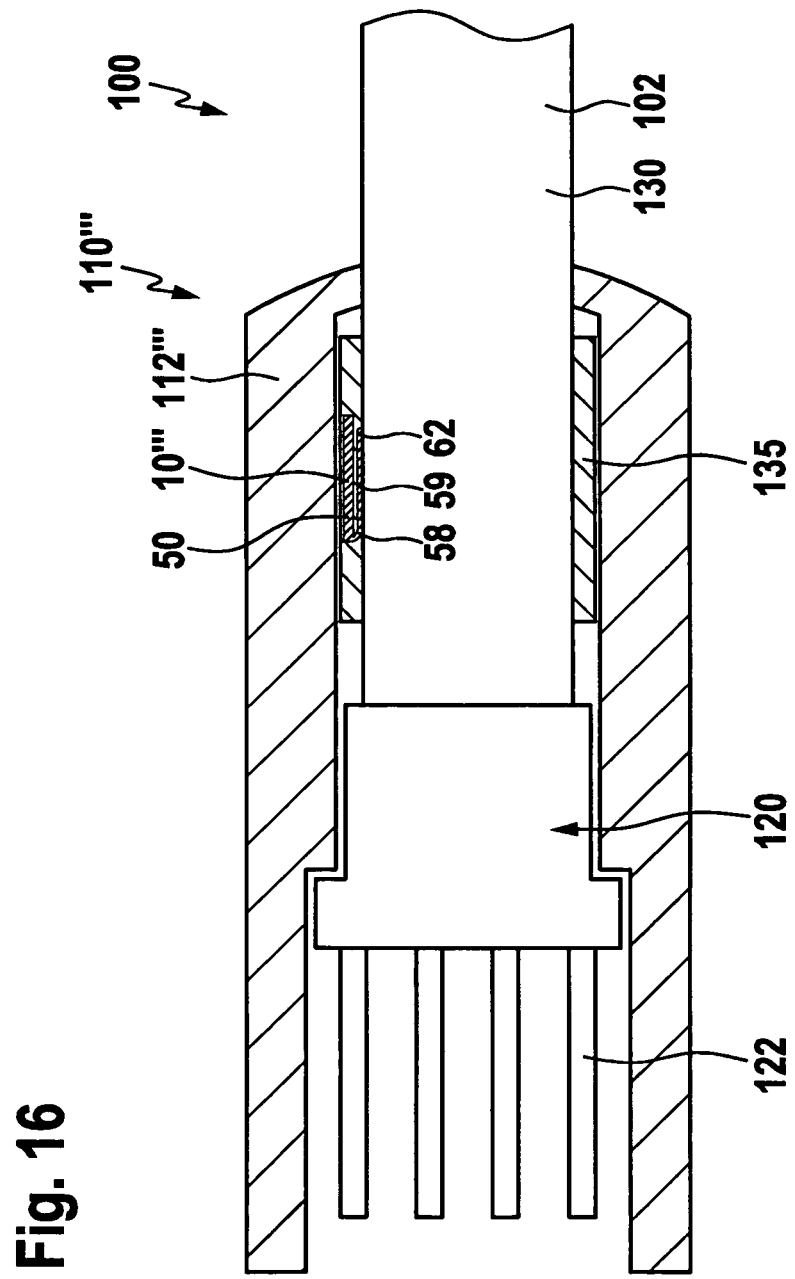
FIG. 16 shows a section through a fourth exemplary embodiment of a plug-in connector element for the first exemplary embodiment of a cable assembly according to the invention.

In the case of a fourth exemplary embodiment of a cable assembly 100 according to the invention, represented in FIG. 16, the cable portion 102 is fixed by frictional engagement in the region of a lateral surface 130 by means of a clamping element 135 in the outer housing 112''', the clamping element 135 being, for example, an elastic element which can be prestressed by the outer housing 112''' and is, for example, held positively in the outer housing 112''' and pressed for frictional engagement against the lateral surface 130 with force closure.

In the case of this exemplary embodiment, an information carrier unit 10''' according to the fourth exemplary embodiment is embedded in the clamping element 135, the embedding body 50 being held positively in the clamping element 135 and the sensor vane 59 lying against the lateral surface 130 and being fixed thereby, preferably by its side 62, to the lateral surface 130, so that, in addition to storing information to the extent described, there is the possibility of also picking up tensile forces on the cable portion 102 by means of the strain gage 60 in the sensor vane 59, in order for example to establish whether the plug-in connector element 110''' has been caused by the cable portion 102 to undergo tensile forces which have, for example, exceeded a threshold value, so that it is uncertain whether the connections of the individual conductors 118 to the contact elements 122 still exist in a reliable and load-bearing form.

Figure 17:
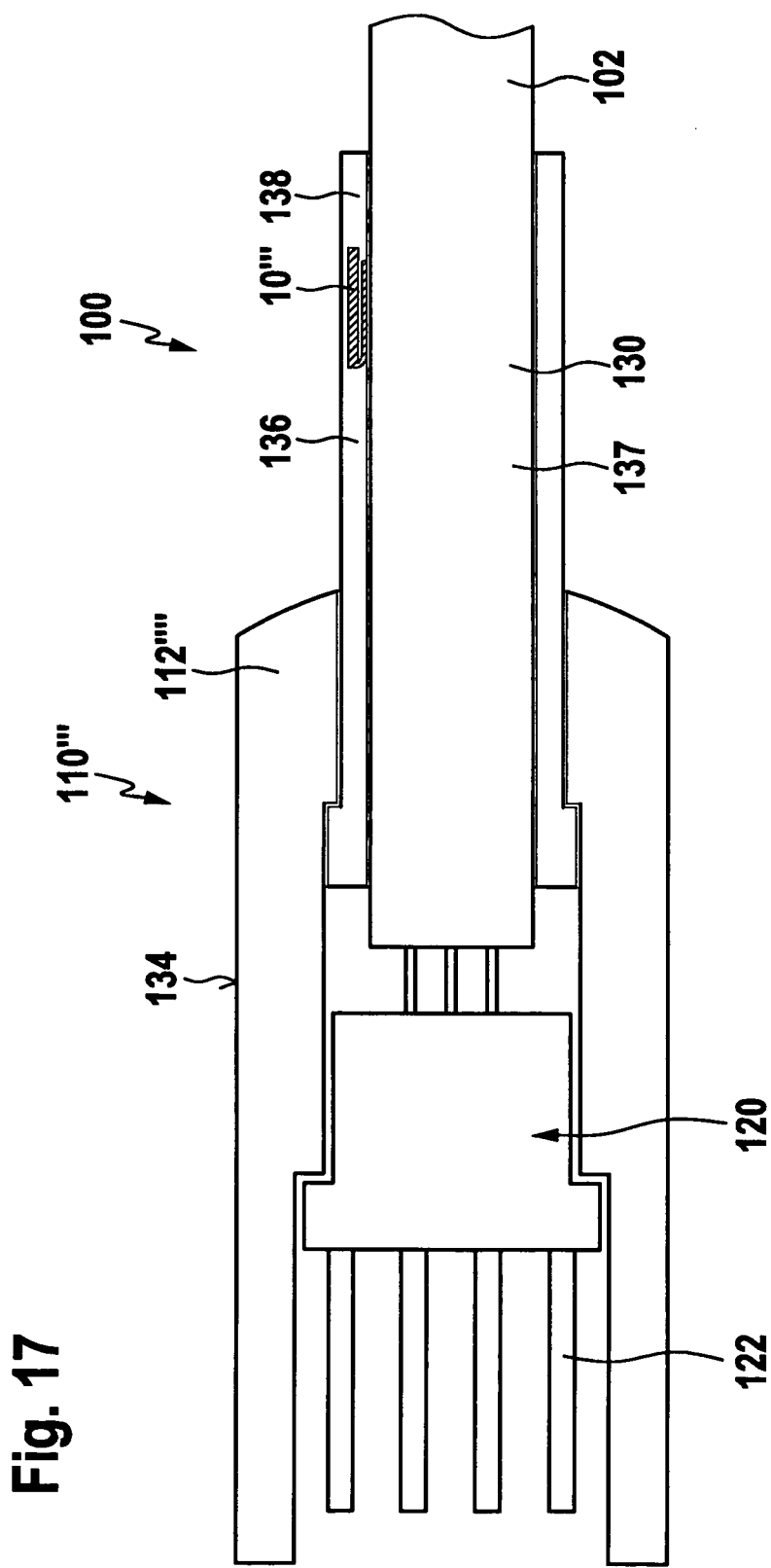
FIG. 17 shows a section through a fifth exemplary embodiment of a plug-in connector element for the first exemplary embodiment of a cable assembly according to the invention.

In the case of a fifth exemplary embodiment of a cable assembly 100 according to the invention, represented in FIG. 17, a kink preventer 136 is provided on the outer housing 112"" as an element for protecting the cable portion 102 which, extending from the outer housing 112"", encloses an end piece 137 of the cable portion 102 that adjoins the latter and supports itself with respect to the outer housing 112"", in order to avoid breakage of the cable portion 102 as it emerges from the outer housing 112"".

In the case of this exemplary embodiment, held in the kink preventer 136 is an information carrier unit 10''' according to the third exemplary embodiment, which is, for example, embedded in a wall portion 138 of the kink preventer 136 or inserted into a recess in the same.

The advantage of the way in which the information carrier unit 10''' is disposed in the kink preventer 136, for example made of plastics or rubber, is that the communication with a read/write device 20, for example, is problem-free, and that, even with a metallic outer housing 112"" of the plug-in connector element 110"", no impairment is caused by this or other parts of the plug-in connector element 110"".

Figure 18:
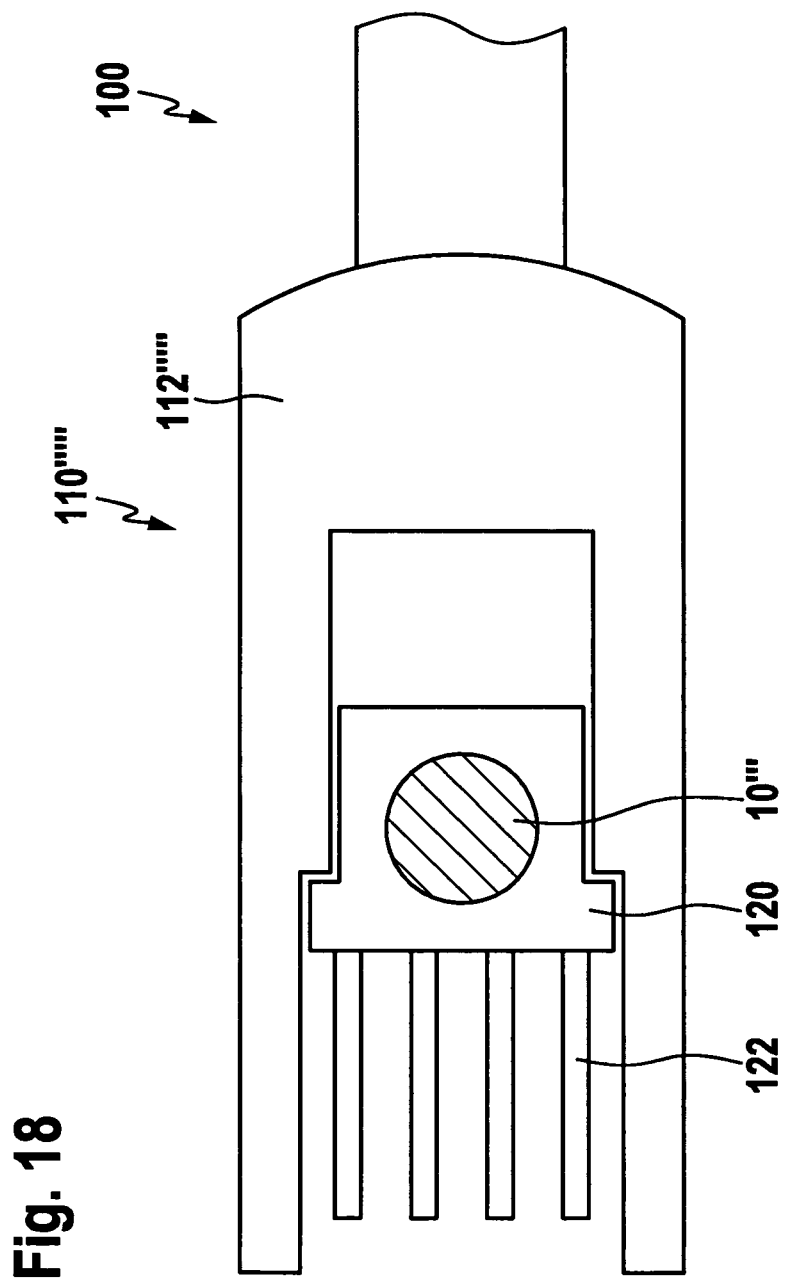
FIG. 18 shows a section through a sixth exemplary embodiment of a plug-in connector element for the first exemplary embodiment of a cable assembly according to the invention.

In the case of a sixth exemplary embodiment of a cable assembly 100 according to the invention, represented in FIG. 18, the information carrier unit, for example an information carrier unit 10''' according to the invention, is not disposed in the outer housing 112""' but in a recess in the contact insert 120, and is consequently capable of picking up additional physical variables in the region of the contact insert 120 by means of the sensor 30 provided.

For example, it would be conceivable with an information carrier unit 10''' of this kind to pick up the temperature in the contact insert, in order to establish whether, for example, the contact elements 122 have been exposed to high currents and consequently have undergone appreciable heating, which may, for example, have led to damage to the connection between the conductors 118 and the contact elements 122.

It can likewise be established on the basis of the heating undergone by the contact insert 120 whether, for example, high transfer resistances have also occurred in the region of the contact elements 122, in particular the plug-in connection of the contact elements 122 to mating contact elements, which likewise has led to heating of the contact elements 122 that lies above a threshold value.

Figure 19:
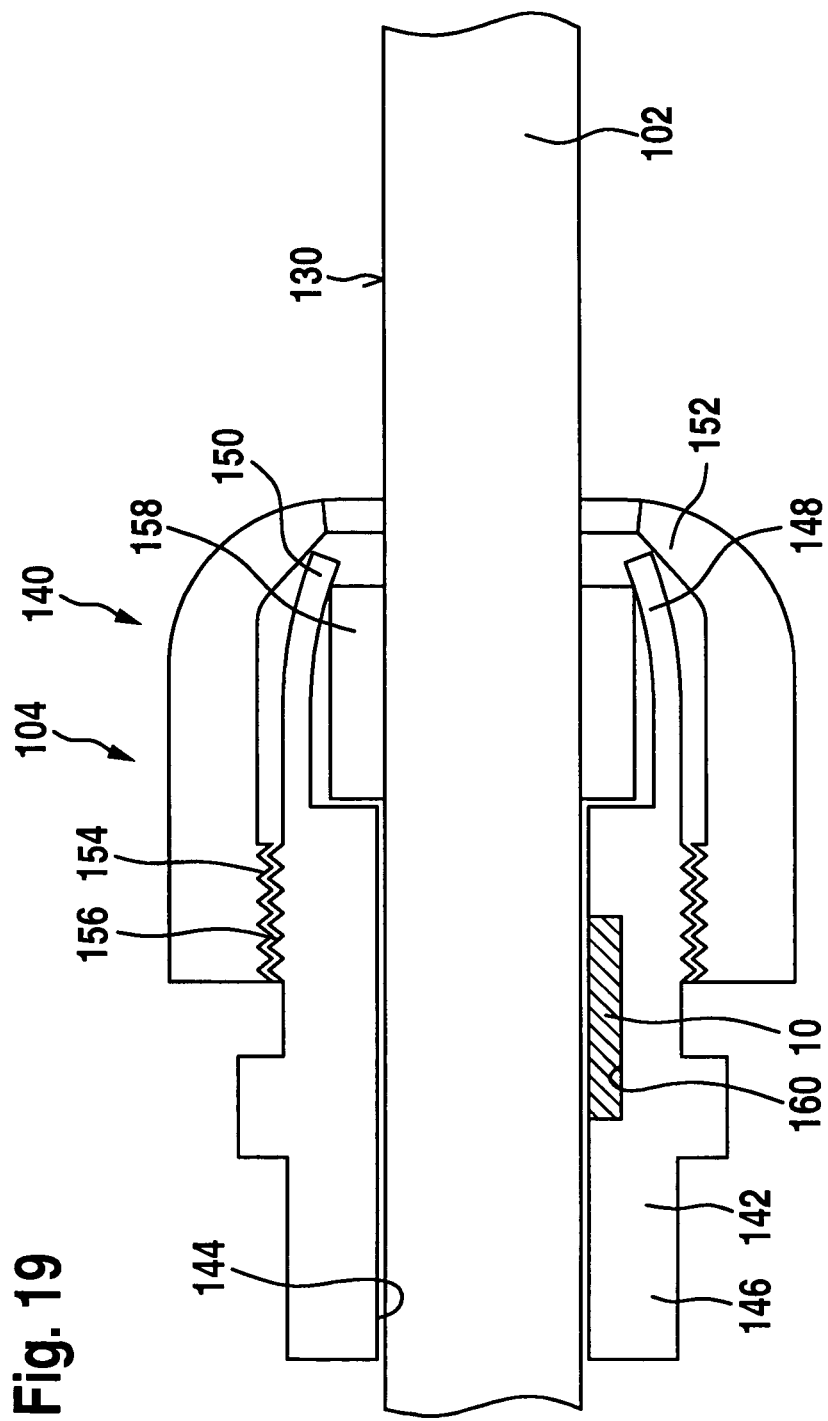
FIG. 19 shows a section through a first exemplary embodiment of a cable gland for the first exemplary embodiment of a cable assembly according to the invention.

In the case of a further exemplary embodiment of a cable assembly 100 according to the invention—represented in FIG. 19—the cable receiving unit 104 is not formed as a plug-in connector element 110 but as a plastics cable gland 140, which has as a base part of a housing a connector 142 with a passage 144 for the cable portion 102.

The connector 142 is provided with a mounting end 146, which serves the purpose of fixing the connector 142 to any desired elements, for example to a housing or an item of equipment, and is provided on an end opposite from the mounting end 146 with a blade cage 148, which has individual tongues 150 that are movable transversely to the lateral surface 130 of the cable portion 102 and can be acted upon in a known way by a union nut 152 as a further housing part, the union nut 152 being provided with a thread 154 and this thread 154 enabling it to be screwed onto a thread 156 provided on the connector 142, in order thereby to act upon the individual tongues 150 of the blade cage 148 in the direction of the lateral surface 130 of the cable portion 102.

In the blade cage 148, there is preferably a clamping element 158, by which the cable portion 102 can be fixed in the region of the lateral surface 130, the clamping element 158 being, for example, a ring of an elastic material, preferably rubber, which can be pressed by the tongues 150 against the lateral surface 130, in order in this way to fix the cable portion 102 for frictional engagement and also produce a sealed closure between the lateral surface 130 of the cable portion 102 and the connector 142.

In the case of a cable gland 140 of this kind there is the possibility, for example, of locating an information carrier unit 10 according to the first exemplary embodiment in a recess 160 provided in the connector 142, the recess 160 extending in a radial direction from the passage 144 into the connector 142, and consequently an information carrier unit 10 that is inserted in the recess 160 does not constrict the passage 144 for the cable portion 102.

For example, the information carrier unit 10 can be disposed in the recess 160 in the same way as in the case of the first exemplary embodiment of the cable assembly 100, represented in FIGS. 12 and 13.

Figure 20:
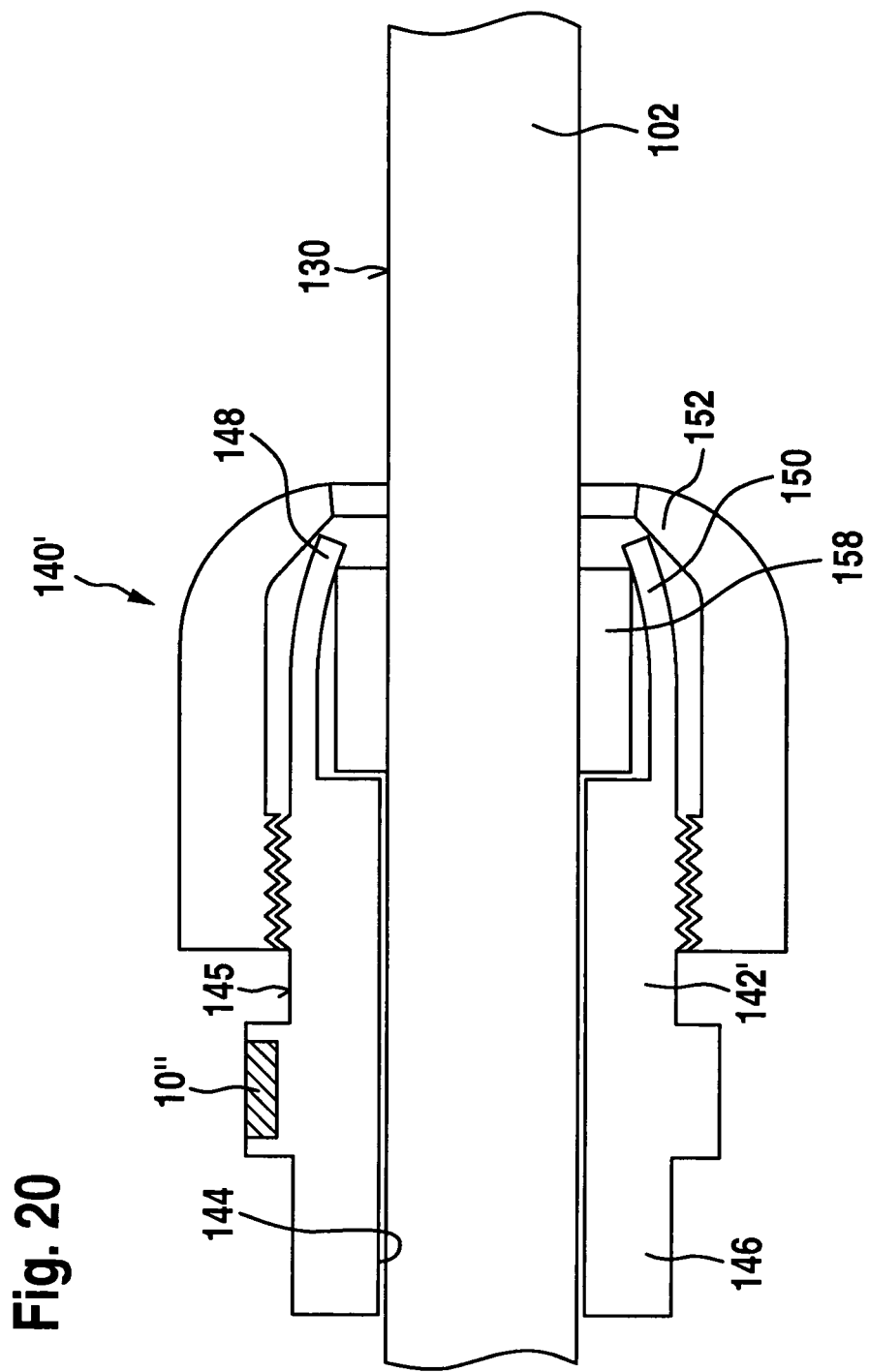
FIG. 20 shows a section through a second exemplary embodiment of a cable gland for the first exemplary embodiment of a cable assembly according to the invention.

In the case of a second exemplary embodiment of a cable gland 140' according to the invention—represented in FIG. 20—an information carrier unit 10" according to the third exemplary embodiment is inserted into the connector 142 of the cable gland 140', the fixing taking place, for example, by encapsulation of the information carrier unit 10" inserted into a recess that is open toward an outer side 145.

Otherwise, this exemplary embodiment 140' of the cable gland is formed in the same way as the first exemplary embodiment of the cable gland 140.

Figure 21:
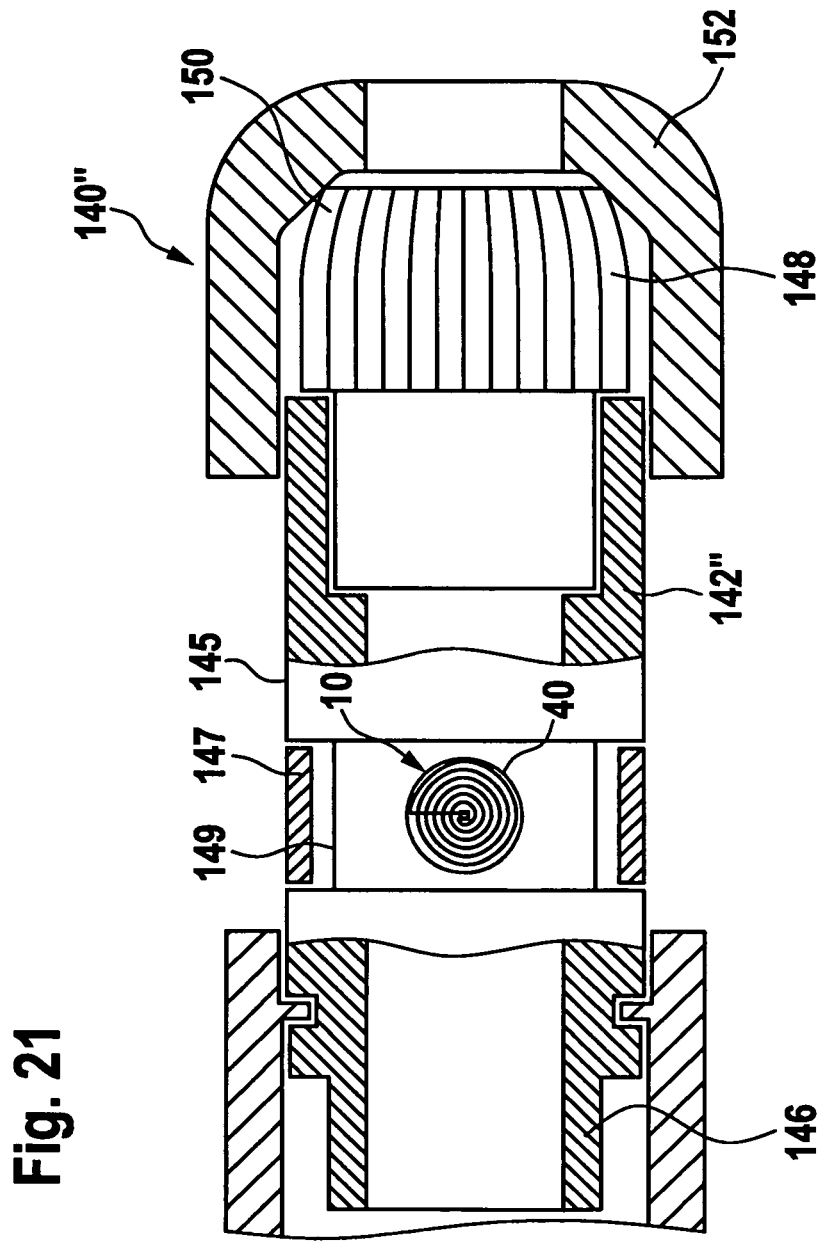
FIG. 21 shows a section through a third exemplary embodiment of a cable gland for the first exemplary embodiment of a cable assembly according to the invention.

In the case of a third exemplary embodiment of a cable gland 140" according to the invention—represented in FIG. 21—a groove-like depression 145, into which a covering ring 147 can be inserted, is provided in the connector 142", extending from the outer side 145 and running at least over part of the circumference.

In the case of the third exemplary embodiment, a base 40 of an information carrier unit 10 according to the first exemplary embodiment lies directly in the depression 145 and is fixed in it by the covering ring 147.

Figure 22:
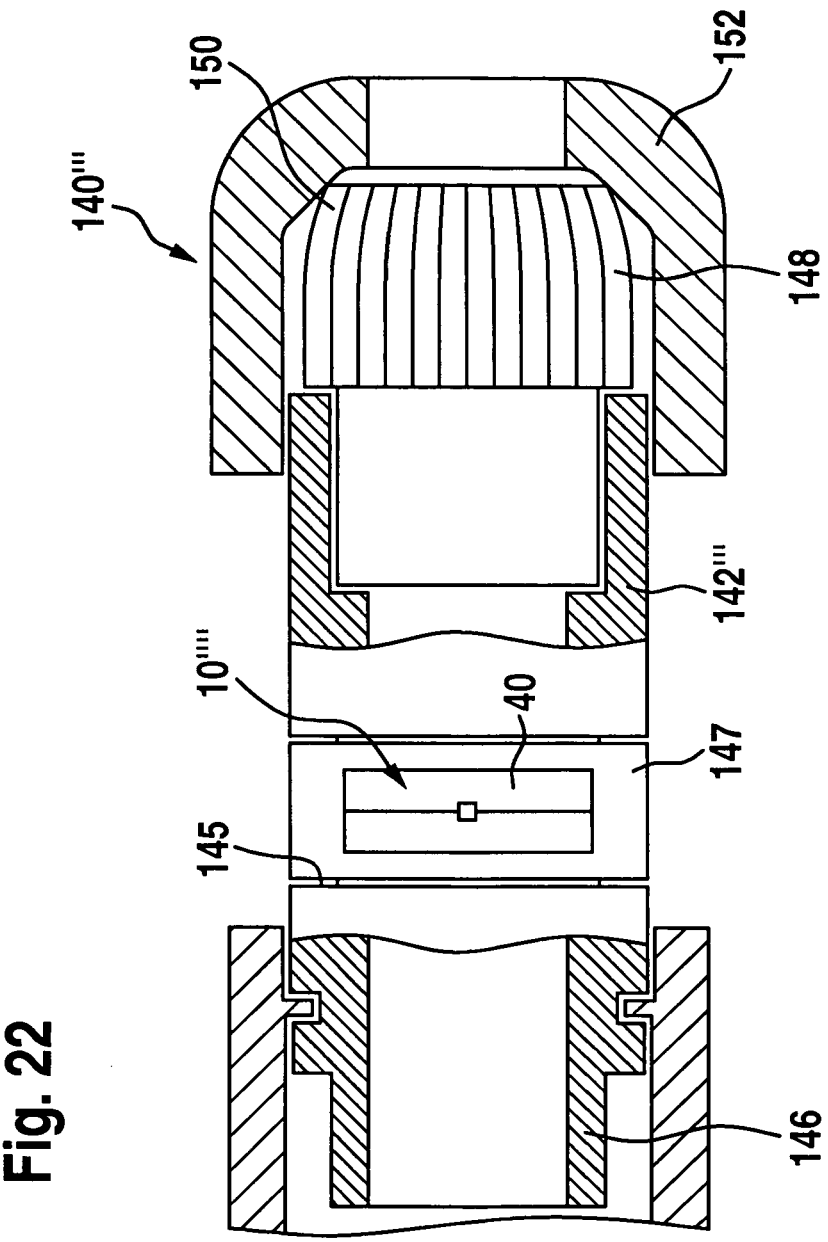
FIG. 22 shows a section through a fourth exemplary embodiment of a cable gland for the first exemplary embodiment of a cable assembly according to the invention.

In the case of a fourth exemplary embodiment of a cable gland 140''' according to the invention—represented in FIG. 22—the base 40 of the information carrier unit 10'''' according to the fifth exemplary embodiment is embedded in the covering ring 147, and consequently can be exchangeably fixed on the connector 142''' by means of the covering ring 147.

Figure 23:
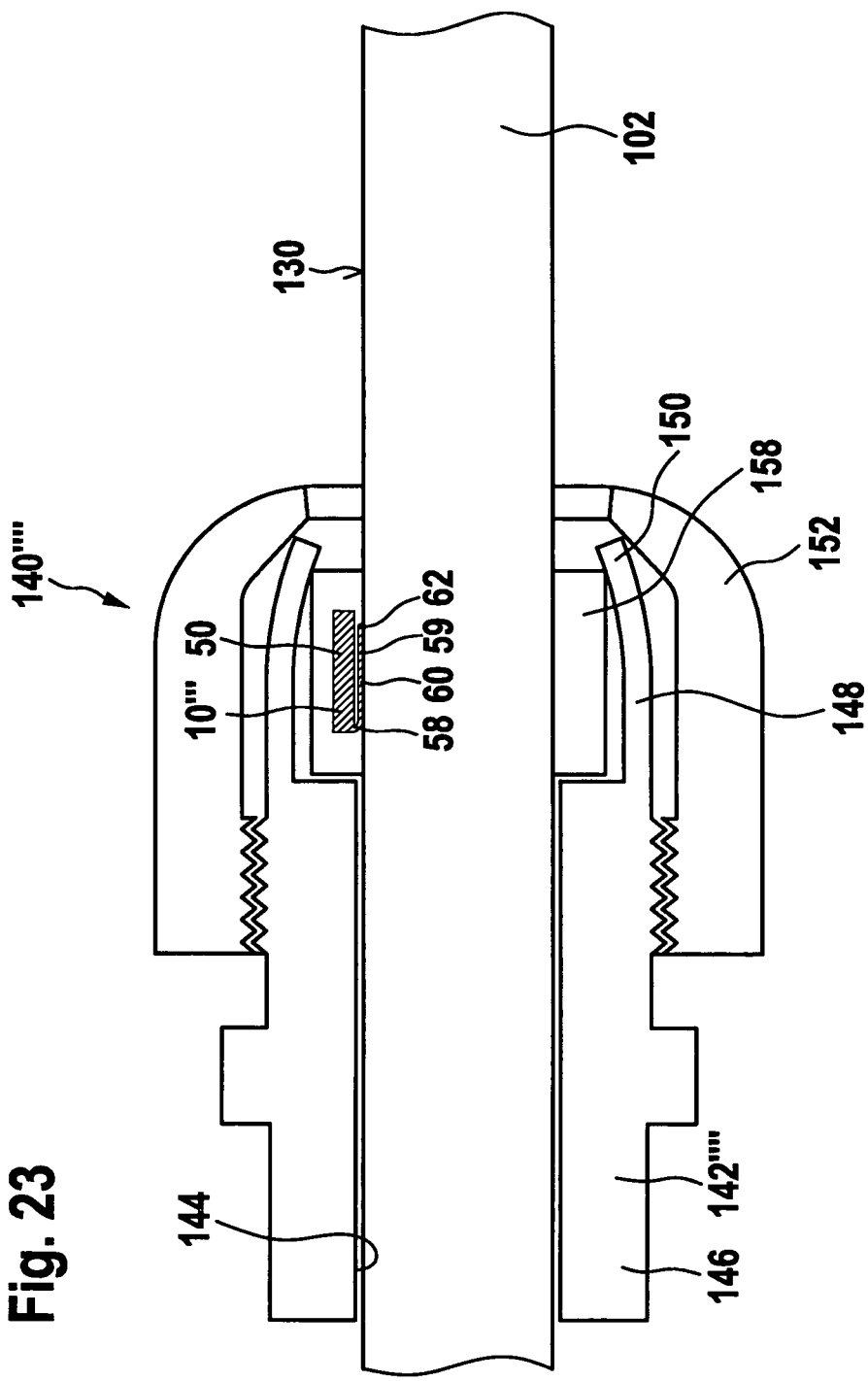
FIG. 23 shows a section through a fifth exemplary embodiment of a cable gland for the first exemplary embodiment of a cable assembly according to the invention.

In the case of a fifth exemplary embodiment of a cable gland 140'''' according to the invention—represented in FIG. 23—the information carrier unit 10''' according to the fourth exemplary embodiment is disposed in the clamping element 158, to be precise in such a way that the embedding body 50 is located in the clamping element itself, while the sensor vane 59 lies against the lateral surface 130 of the cable portion, in particular is fixed with its side 62 against the lateral surface 130, so that the strain gage 60 integrated in the sensor vane 59 is capable of picking up tensile forces acting on the clamping element 158 through the cable portion 102.

It is in this way possible not only to store information but at the same time also to detect tensile forces acting on the cable portion 102, and in particular to detect whether they have exceeded a value which is relevant for the cable portion 102, in particular the service life or functional capability thereof.

Figure 24:
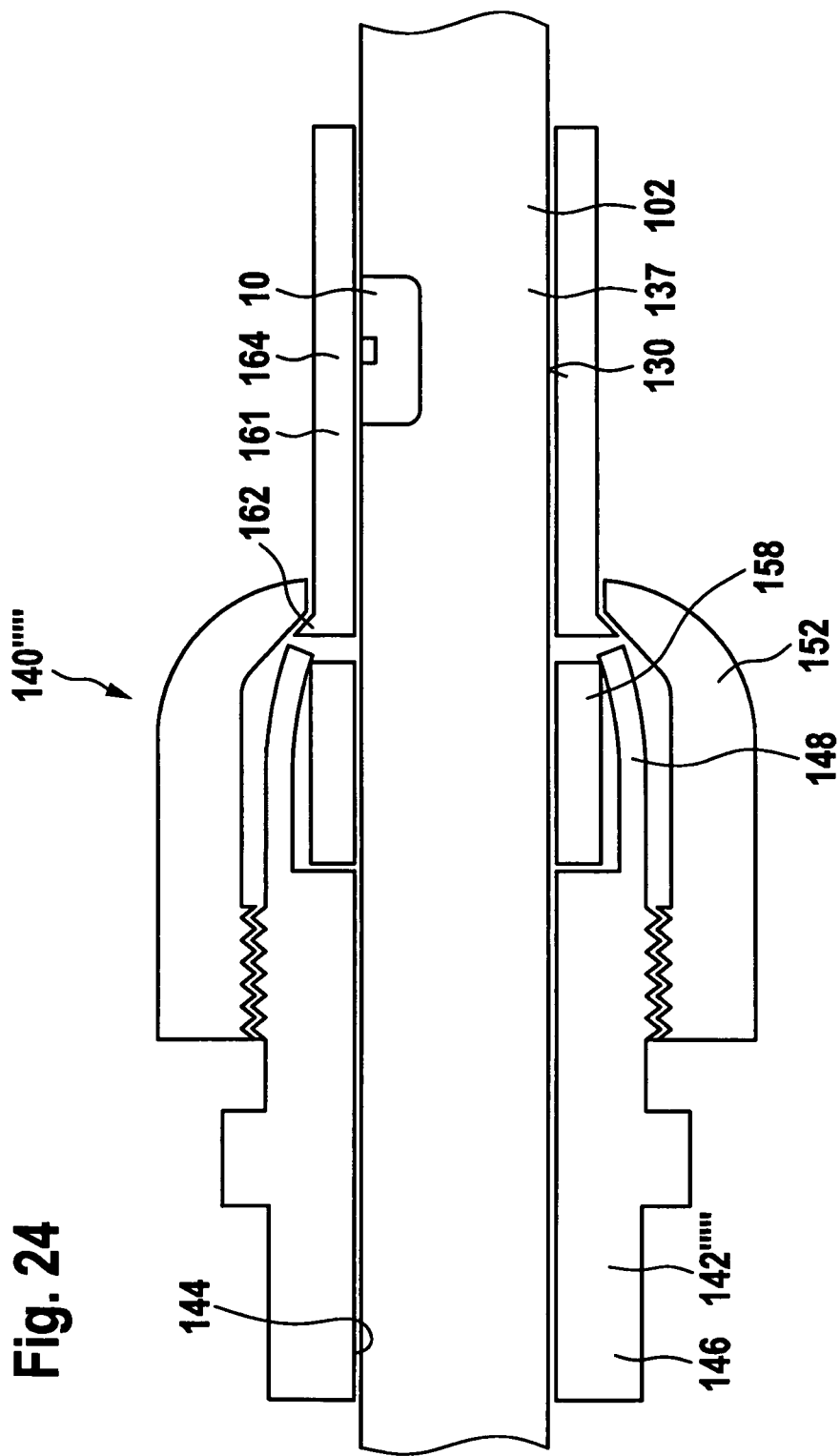
FIG. 24 shows a section through a sixth exemplary embodiment of a cable gland for the first exemplary embodiment of a cable assembly according to the invention.

In the case of a sixth exemplary embodiment of a cable gland 140''''', represented in FIG. 24, there extends from the union nut 152 a protective element 161, which encloses an end piece 137 of the cable portion 102 that extends out of the union nut 152 from the clamping element 158.

The protective element 161, formed for example as a protective sleeve, is held with a holding lip 162 in the union nut 152 and covers over an information carrier unit 10 according to the first exemplary embodiment, which in this case is located on the lateral surface 130 of the end piece 137 of the cable portion 102, for example is adhesively attached in the manner of a label, so that the protective element 161 also covers over and protects the information carrier unit 10 with a wall portion 164.

In the exemplary embodiment represented, the protective element 161 is, for example, a protective sleeve made of rubber or a plastics material.

Figure 25:
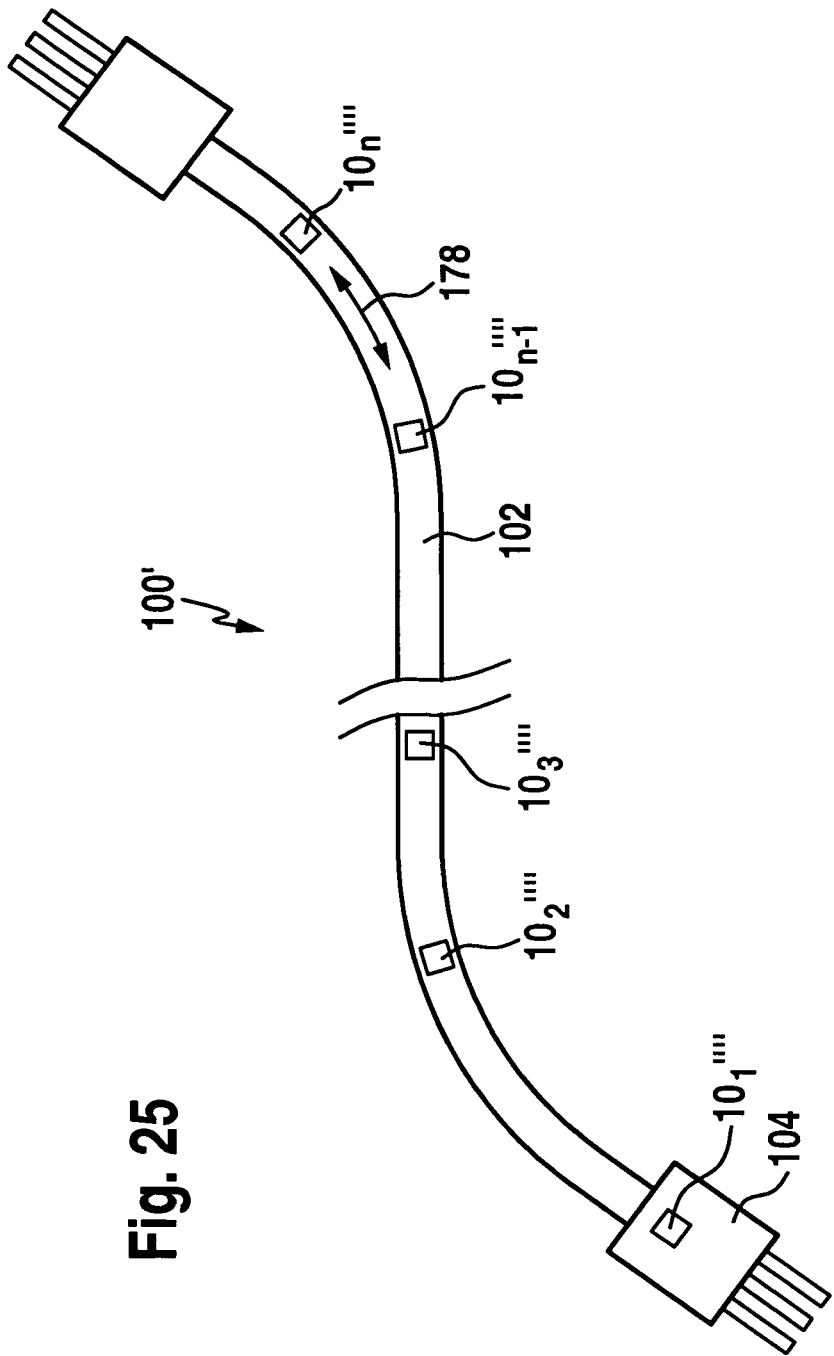
FIG. 25 shows a perspective representation similar to FIG. 11 of a second exemplary embodiment of a cable assembly according to the invention.
Figure 26:
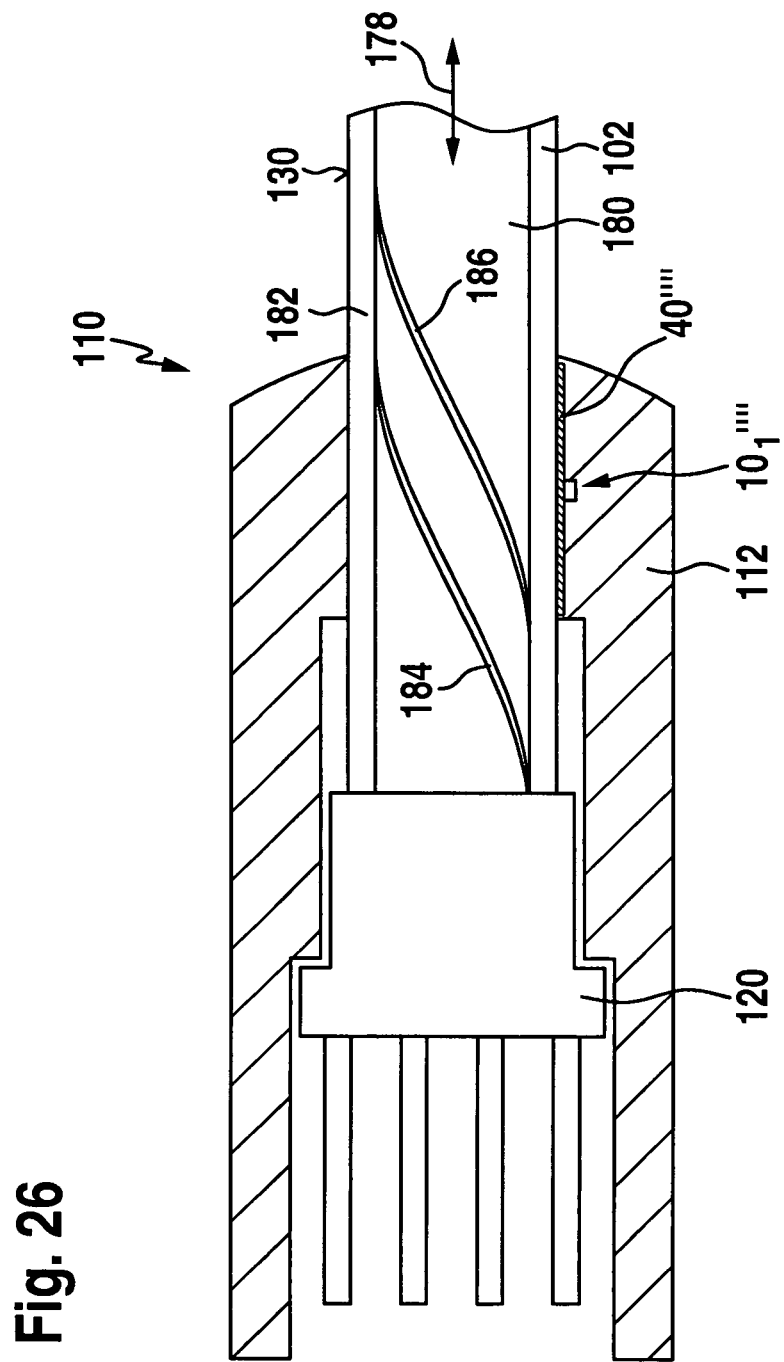
FIG. 26 shows a section through a plug-in connector element for the second exemplary embodiment of the cable assembly according to the invention.
Figure 27:
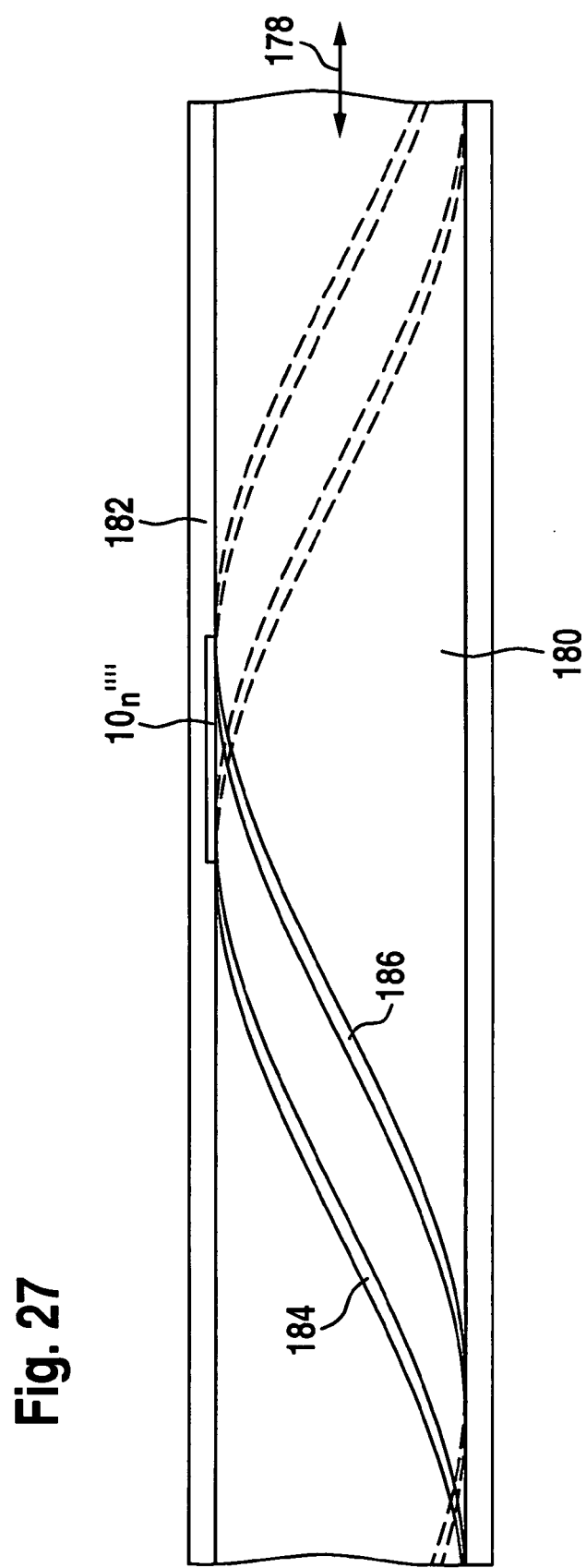
FIG. 27 shows a section through a piece of a cable portion of the second exemplary embodiment of the cable assembly according to the invention.

In the case of a further exemplary embodiment of a cable assembly 100' according to the invention, both the cable portion 102 and the cable receiving unit 104 are provided with information carrier units, for example the information carrier units according to the fifth or sixth exemplary embodiment. In the exemplary embodiment represented in FIGS. 25 to 27, the cable portion 102 comprises, for example, an inner body 180, which is enclosed by a sheath 182.

Running in this case in the inner body 180 are individual conductors, for example the lines 184 and 186, which are also twisted with further lines (not specifically represented) in the inner body 180.

For example, the lines 184 and 186 carry an AC current with a frequency of 50 Hz, which consequently produces the alternating magnetic field 31 (FIG. 7), which acts on the antenna parts 18*b* of the information carrier units $10_1''''$ to $10_n''''$ according to the fifth exemplary embodiment, so that the latter are capable of drawing energy from the alternating magnetic field 31, and consequently supplying the information carrier units 10'''' with energy as long as the current is flowing in the lines 184 and 186.

The information carrier unit $10_1''''$, disposed on the one hand in the plug-in connector element 110, and the information carrier units $10_2''''$ to $10_n''''$, disposed on the other hand at defined, preferably constant, spacings A in the cable portion 102, are consequently capable of operating and acquiring information irrespective of the presence of a read/write device 20.

In addition, on the basis of the fact that the information carrier units 10"" operate in the UHF range and the antenna parts 18a are dipole antennas 70, said information carrier units can interact with one another in the longitudinal direction 178 of the cable portion 102, so that, for example, the information carrier unit $10_1$"", which is disposed in the plug-in connector element 110 made of a plastics material, is capable of interacting and exchanging information with the first information carrier unit $10_2$"" nearest to it in the cable portion 102.

The first information carrier unit $10_2$"" can itself also once again interact and exchange information with the second information carrier unit $10_3$"" nearest to it in the cable portion 102, so that, with these information carrier units 10"" that are capable of communicating with one another, information can be passed on in the longitudinal direction 178 of the cable portion 102.

Furthermore, the information carrier unit $10_1$"" in the plug-in connector element 110 is capable of exchanging information with the read/write device 20 and consequently represents access to an information carrier network which is provided in the cable assembly 100' and over which information can be transmitted in the longitudinal direction 178 of the cable portion 102.

The read/write device 20 may in this case be a mobile, portable read/write device.

As an alternative to this, a stationary read/write device 20 can also be used. A stationary read/write device may be formed in a simple way such that it has a larger antenna 19 and transmits with greater transmitting power than a mobile portable read/write device, so that a much greater range of communication with the information carrier unit is possible. It is thus possible, for example, to communicate directly with information carrier units in the cable portion.

For reasons of controlled communication, however, it is advantageously provided that, even if it is stationary, the read/write device first communicates with the information carrier unit in the plug-in connector element and this then communicates once again with the information carrier units, in particular the nearest information carrier unit 10"", in the cable portion 102.

If, for example, the sensor 30 associated with the information carrier units $10_2$"" to $10_n$"" is a temperature sensor, there is the possibility of using the information carrier unit $10_1$"" in the plug-in connector element 110 to retrieve the temperatures of the sensors 30 of the other information carrier units $10_2$"" to $10_n$"", which are disposed along the cable portion 102, and in this way to transmit them to the read/write device 20.

In the same way, other physical variables that can be picked up by the sensors 30, such as for example tension, pressure, moisture or else radiation, may be determined and sampled.

The advantage of this solution according to the invention is that the plug-in connector element 110 always represents the accessible element, irrespective of how the cable assembly 100' is laid, so that access to the information carrier network of the cable assembly 100' is also provided by way of the plug-in connector element 110, it being possible to use for this purpose either a mobile read/write device 20 or a stationary read/write device 20, which is, for example, associated with an item of equipment to be connected to the plug-in connector element or even with a mating plug-in connector element.

Figure 28:
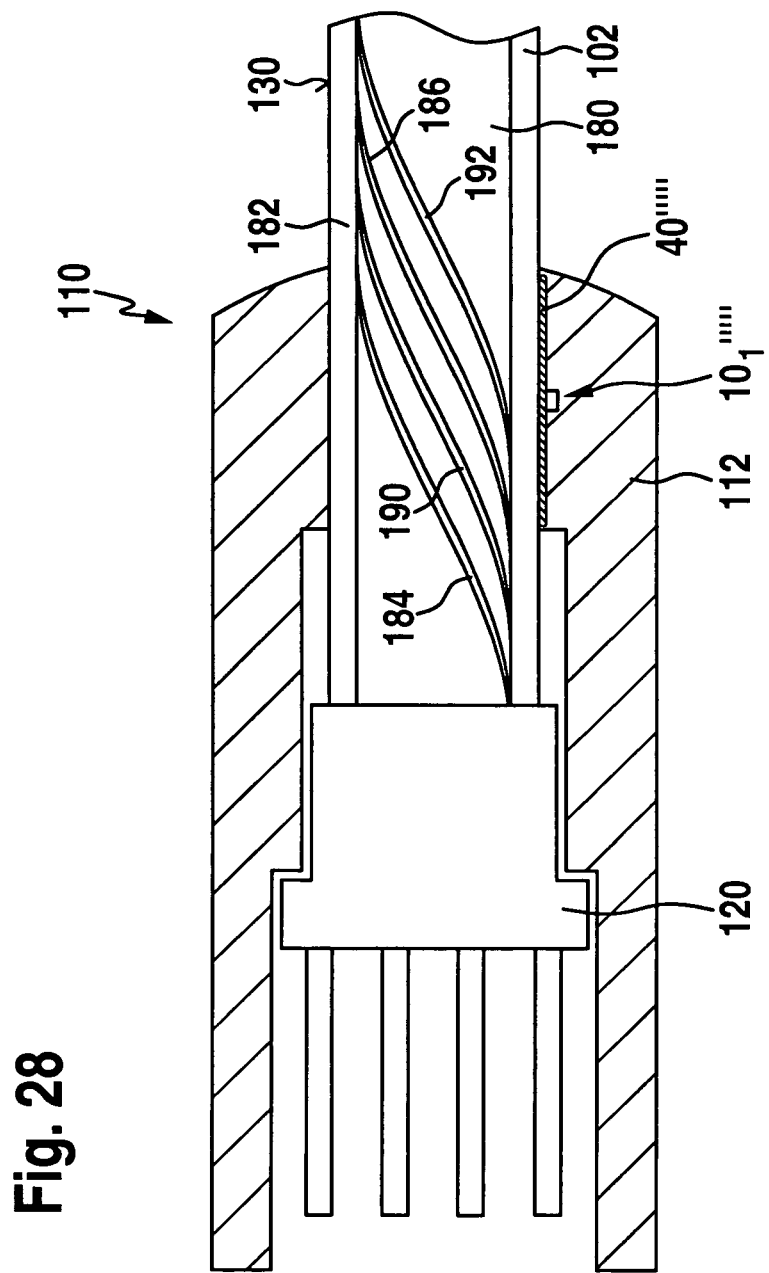
FIG. 28 shows a section through a first exemplary embodiment of a plug-in connector element of a third exemplary embodiment of a cable assembly according to the invention.
Figure 29:
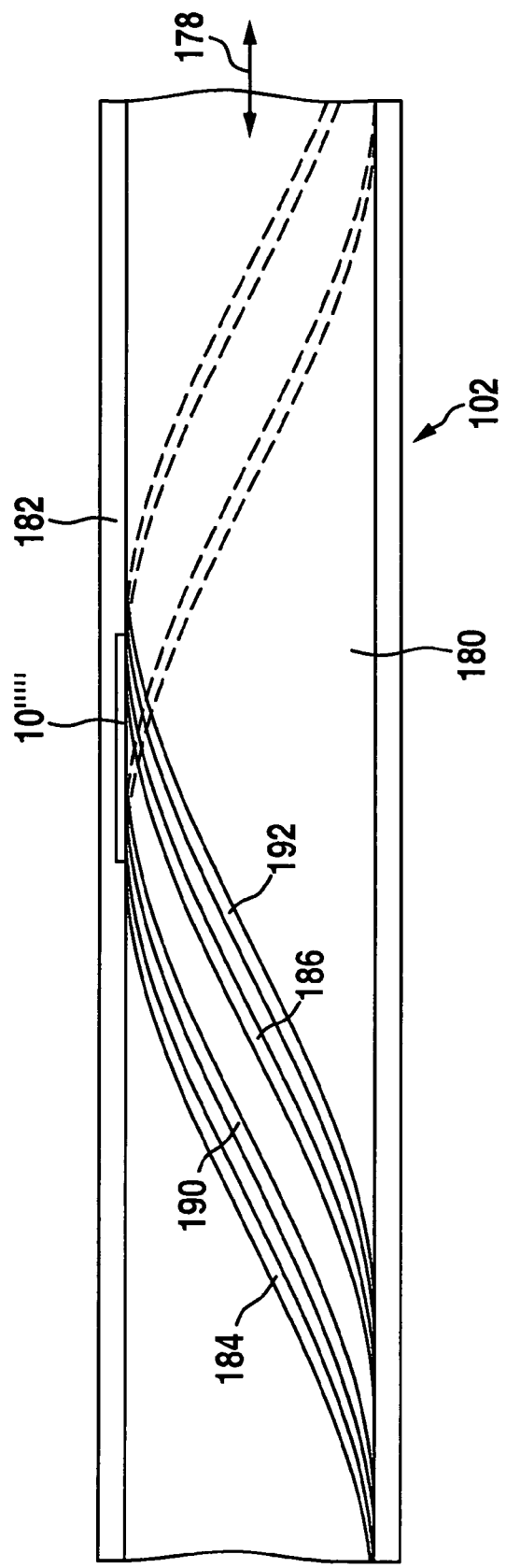
FIG. 29 shows a section through a piece of the cable portion in the case of the third exemplary embodiment of a cable assembly according to the invention.
Figure 30:
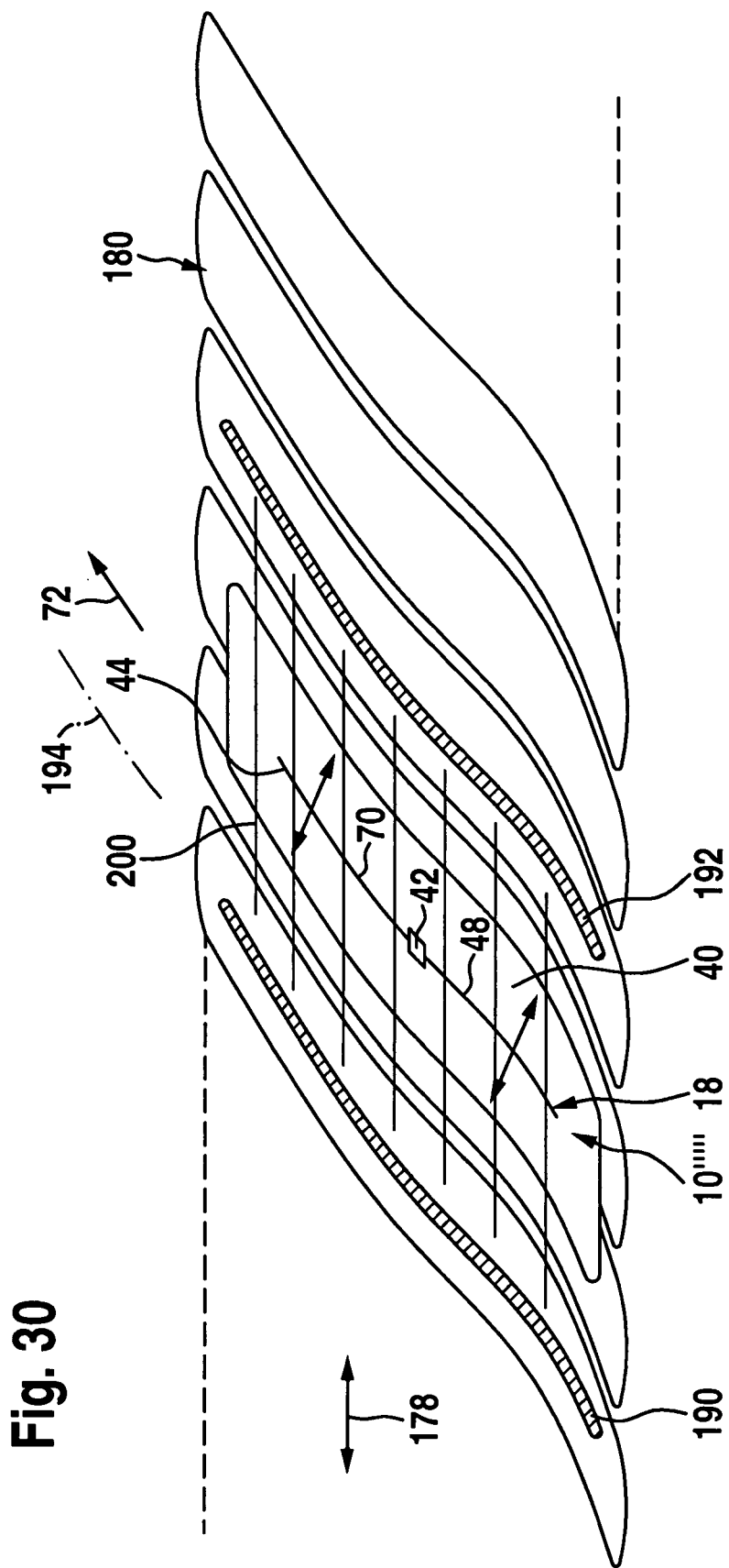
FIG. 30 shows an enlarged detail of a section according to FIG. 29 through the third exemplary embodiment of the cable assembly according to the invention.

In the case of a further exemplary embodiment of a cable assembly according to the invention, represented in FIGS. 28 to 30, in a way similar to the case of the previous exemplary embodiment, information carrier units 10"" according to the fifth exemplary embodiment, which likewise interact with one another, are used.

To improve the interaction of the information carrier units 10"" with one another, provided in the inner body 180 in addition to the lines 184 and 186 and further lines that are not pictorially represented are lines 190 and 192, which are galvanically isolated from one another and are likewise twisted with the other lines, so that all the lines are disposed around the longitudinal direction 178 of the cable portion 102 and run at an angle to a parallel to the longitudinal direction 178, which intersects the respective line 184, 186 or 190 and 192.

As schematically illustrated in a simplified form in FIG. 30, with just the dipole antenna 70 being represented, the information carrier units 10"" are in this case aligned in relation to the lines 190 and 192 in such a way that the directions 72 along which the dipole antennas 70 extend run approximately parallel to a twisting direction 194.

With the dipole antennas 70 aligned as described, one component of the dipole radiation direction 74 lies transversely to the twisting direction 194, preferably perpendicularly thereto, so that the dipole antenna 70 mainly emits altogether transversely to the direction 72, and consequently also transversely to the longitudinal direction of the dipole antenna 70, and is mainly suitable for receiving electromagnetic radiation.

If the lines 190 and 192 are galvanically isolated from one another, a parasitic coupling may take place between these lines 190 and 192 and the dipole antenna 70 of the information carrier unit 10"" by way of an electromagnetic field 200, which is created by the two lines 190 and 192 likewise behaving in the manner of dipoles and consequently entering into interaction with the antenna unit 18a formed as a dipole antenna 70.

The frequency range in which an electromagnetic field 200 of this kind forms is in this case preferably predetermined by a resonant frequency range of the antenna unit 18, while the two lines 190 and 192 are disposed and formed in such a way that they do not have any resonant frequency range or any shielding, in order to obtain good emission.

This coupling, caused by the parasitic electromagnetic field 200, between the antenna unit 18 of the respective information carrier unit 10"" and the lines 190 and 192 allows an effective antenna range which is a multiple of, at least approximately twice, still better more than approximately 10 times, an antenna range between antenna units 18 of neighboring information carrier units 10"" to be achieved in the cable portion 102 in the longitudinal direction 178 of the cable portion 102, if these antenna units 18 are disposed in such a way that they are free from any interaction, that is to say without any influencing by their surroundings.

In this case, the antenna range is understood as meaning the range of an antenna unit 18 in which it is still possible with a defined antenna field strength to transmit information in the longitudinal direction 178 of the cable portion 102 from one information carrier unit 10"" to the next information carrier unit 10"".

There is consequently the possibility, for example, of disposing the antenna units 18 of the information carrier units 10"" in such a way that the spacing in the longitudinal direction 178 of the cable corresponds at most to the effective antenna range, whereby a coupling between the antenna units 18 of the information carrier units 10'''' in the longitudinal direction 178 of the cable portion 102 takes place within the spacing.

This increased effective antenna range on the basis of the coupling by way of parasitic electromagnetic fields 200 between the antenna units 18 and the conductors 190 and 192 makes it possible, for example, to reduce the number of information carrier units 10'''' that are required for the information carrier network.

However, it may also be advantageous to dispose the dipole antennas 70 transversely to the twisting direction, and in particular if this has the effect that as many electrical conductors as possible, or all the electrical conductors, are wrapped around. As a result, the electromagnetic waves are coupled into as many electrical conductors as possible.

Also in the case of this exemplary embodiment there is consequently likewise the possibility of sampling by way of the information carrier network physical variables that can be picked up by the respective sensors 30 along the entire cable portion 102 of the cable assembly 100'.

In the case of this exemplary embodiment of the cable assembly 100', the information carrier units 10'''' are preferably disposed under the sheath 182 or in the sheath 182 of the cable portion 102, and are consequently embedded in the sheath 182, for example, during the production of the cable portion 102.

There is, however, also the possibility in principle of adhesively attaching the information carrier units 10'''' to the sheath 182 of the cable portion 102 in the manner of stick-on elements.

Figure 31:
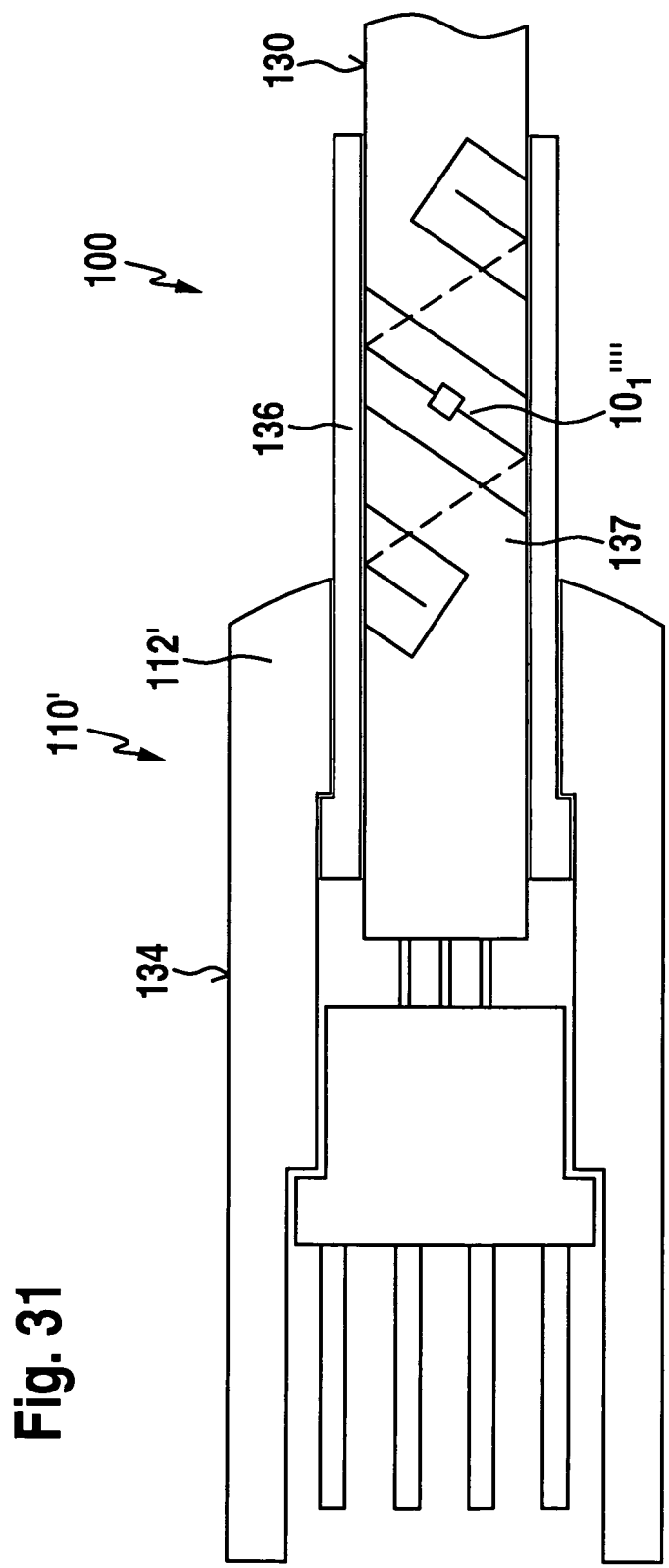
FIG. 31 shows a section similar to FIG. 28 through a second exemplary embodiment of a plug-in connector element of the third exemplary embodiment of a cable assembly according to the invention.

In the case of a further exemplary embodiment of a cable assembly according to the invention, represented in FIG. 31, the information carrier unit $10_1''''$ is disposed on the lateral surface 130 of the end piece 137 and covered by the kink preventer 136, which, in a way similar to that represented in FIG. 17, is held in the outer housing 112.

In the case of this exemplary embodiment, the base 40 is adhesively attached to the lateral surface 130 in a way similar to an adhesive label and is thereby fixed to the cable portion 102 at a point under the kink preventer 136.

As an alternative to this, it is also possible during the production of the kink preventer 136 for the information carrier unit 10'''' to be embedded in the latter, running in such a way that it wraps around the end piece 137, for example by being molded-in during the production of the kink preventer 136.

Since the kink preventer 136 is made of a plastics material or rubber, interaction with a read/write device 20 is possible in a problem-free manner, without an outer housing 112 of the plug-in connector element that is produced from metal being able to disturb the interaction, and furthermore parasitic field coupling with the lines 190 and 192 in the inner body 180 of the cable portion 102 is possible, in order to form the information carrier network with the other information carrier units 10'''' in the cable portion 102.

Access to this information carrier network takes place, for example, by way of a mobile read/write device 20 or by way of a read/write device 20 associated with a mating plug-in connector element 210, as described below.

Figure 32:
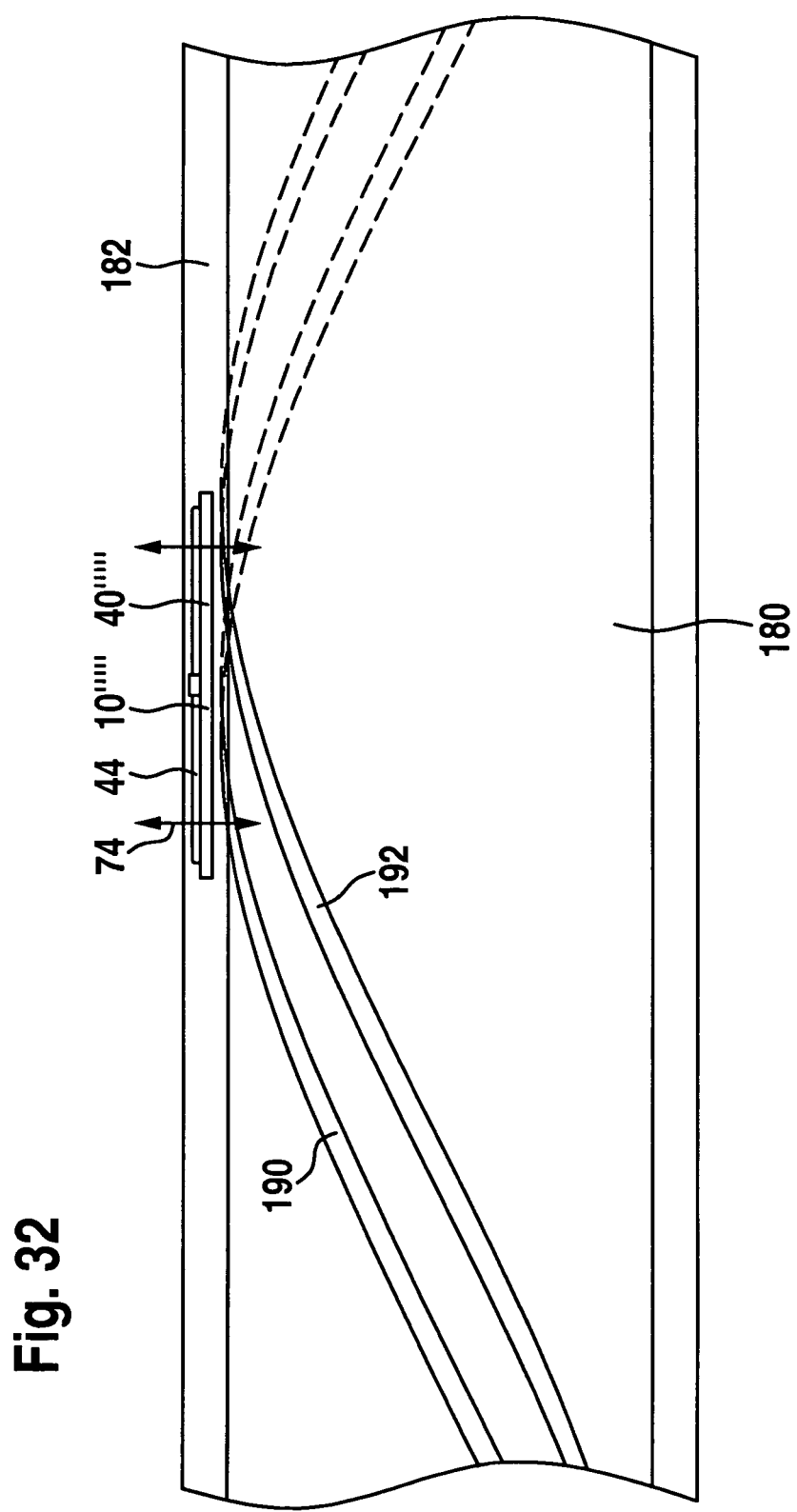
FIG. 32 shows a section similar to FIG. 29 through a fourth exemplary embodiment of a cable assembly according to the invention.

For the case where elongations or tensile forces in the cable portion 102 are to be picked up, it is possible, as represented in FIG. 32, to use instead of the information carrier unit 10'''', an information carrier unit 10''''' according to the sixth exemplary embodiment, in this case the information carrier unit 10''''' then being disposed in the cable portion 102, for example embedded in the sheath 182 or fixed to the inner body 180.

Figure 33:
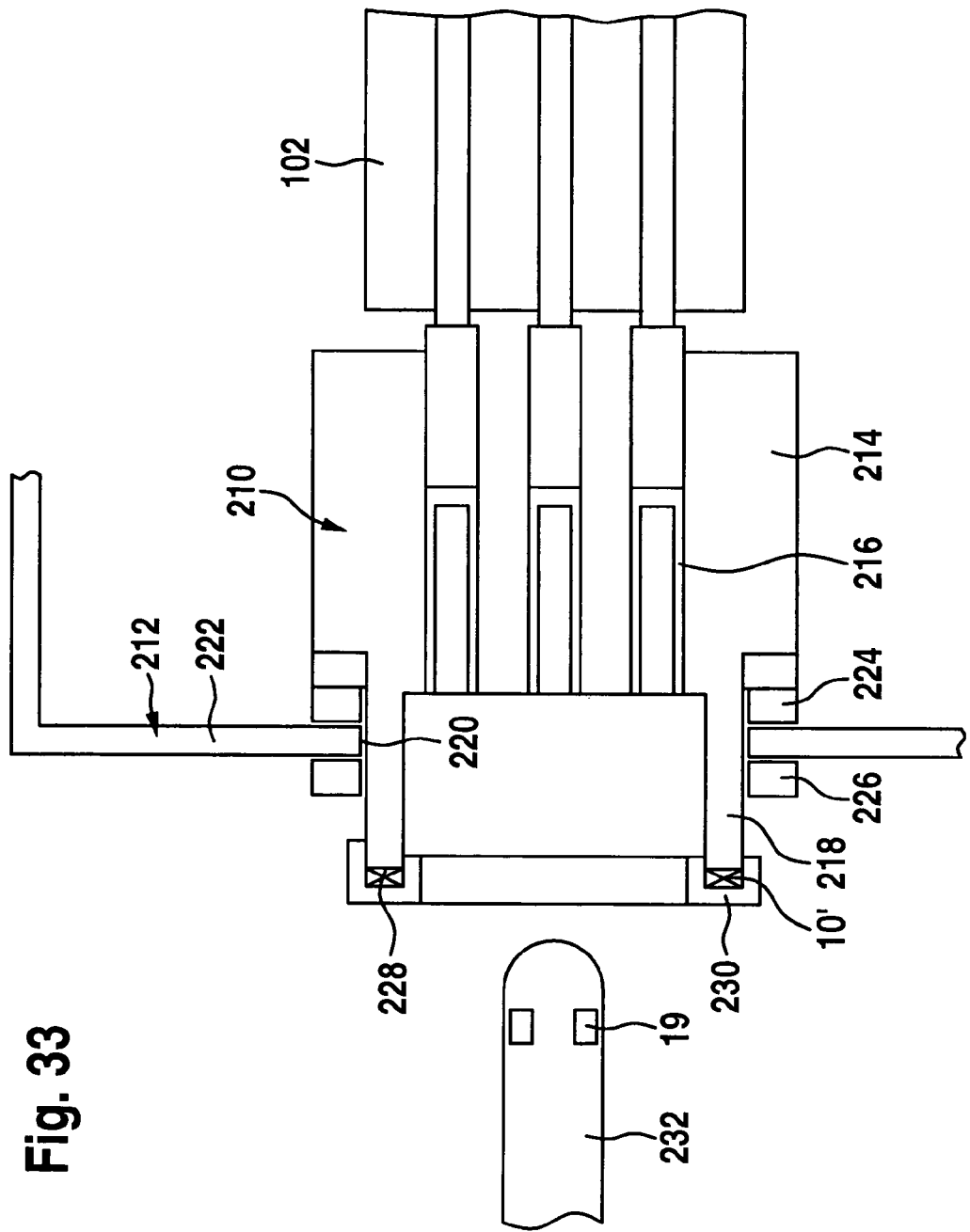
FIG. 33 shows a section through an exemplary embodiment of a mating plug-in connector element according to the invention.
Figure 34:
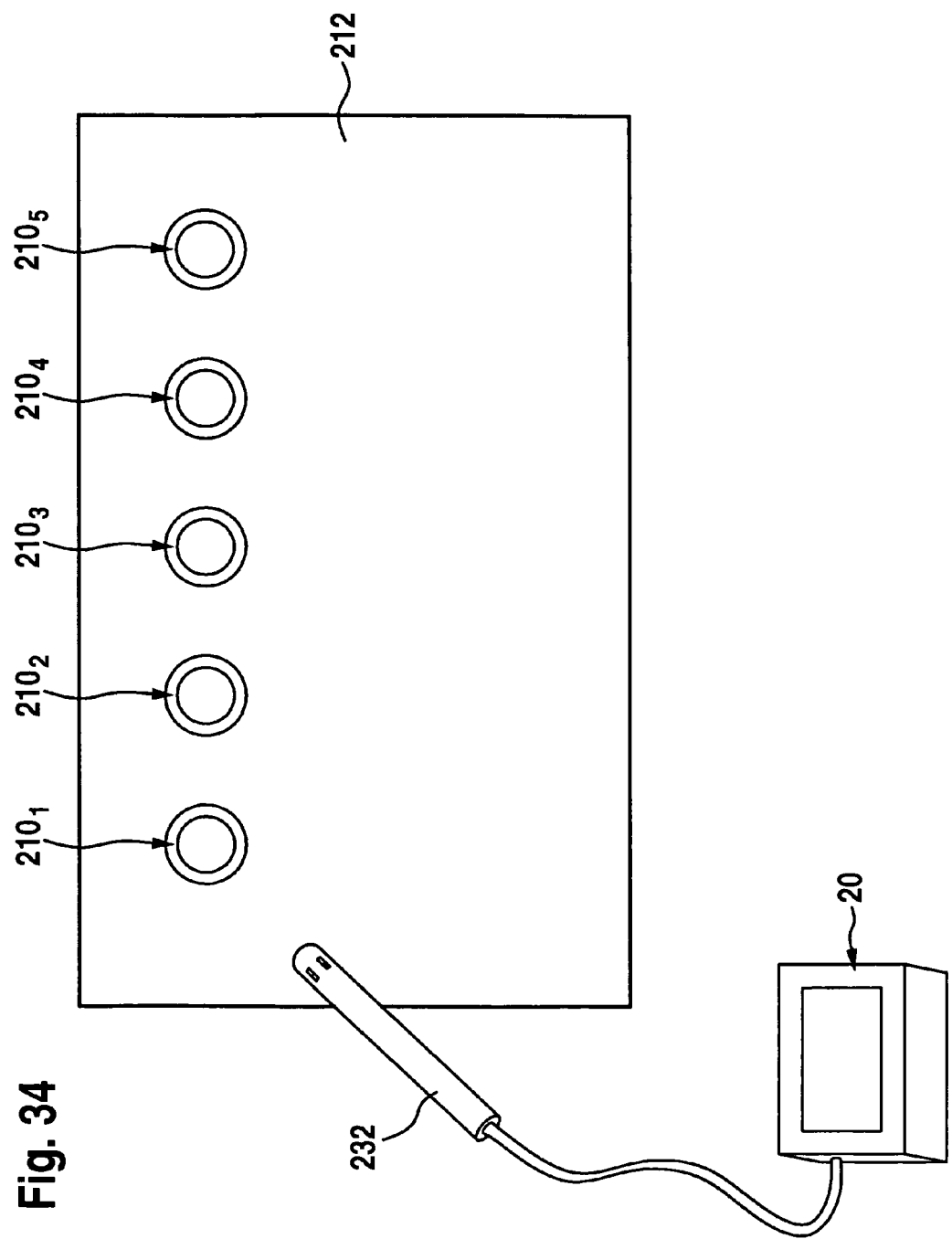
FIG. 34 shows a view of a housing with a number of mating plug-in connector elements according to the exemplary embodiment in FIG. 33

A further exemplary embodiment of a cable receiving unit according to the invention that is represented in FIGS. 33 and 34, for example formed as a mating plug-in connector element 210 which can be mounted on the housing 212 of an item of equipment, has a contact base 214, in which contact sleeves 216 are disposed.

The contact base 214 is connected to a mounting sleeve 218, which forms a base part and for its part engages through an aperture 220 in a housing wall 222 and can be fixed to the latter, for example by holding nuts 224, 226 which can be screwed onto the mounting sleeve 218.

In order to be able to identify the mating plug-in connector element 210 as a whole, an information carrier unit 10' according to the second exemplary embodiment is held on the mounting sleeve 218 at a region of the same extending outside the equipment housing 212, and is thereby disposed for example on an end face 228 of the mounting sleeve and covered over by an electrically nonconducting protective ring 230, which engages in a cross-sectionally U-shaped manner over the end face 228 of the mounting sleeve 218 together with the information carrier unit 10' located on it.

With an information carrier unit 10' of this kind disposed on the mounting sleeve 218, there is the possibility, even if the housing wall 222 is made of metal, of using a reading head 232, which carries the antenna unit 19 of the read/write device 20, in a simple way and with good coupling, to read out the information from the information carrier unit 10' without impairment by the housing wall 222, and thereby make data that are relevant to the mating plug-in connector element 210 available.

For example, it is conceivable for the information carrier unit 10' to have information concerning the type of mating plug-in connector element 210, how its contacts are disposed and, in particular, also how the contact sleeves 216 are wired, so that there is the possibility, as represented in FIG. 34, when there are a large number of mating plug-in connector elements $210_1$ to $210_5$ mounted on a housing 212, of detecting by means of the read/write device 20, which of the mating plug-in connector elements $210_1$ to $210_5$ is wired and how, in order to find out into which of the mating plug-in connector elements $210_1$ to $210_5$ a corresponding plug-in connector element should be inserted (FIG. 34).

In addition, there is also the possibility, in particular in the case of complex circuits with a large number of mating plug-in connector elements 210 provided, of checking the individual plug-in connections in detail.

The advantage of the solution according to the invention can be seen in that, with a suitable annular formation of the base 40' and of the conductor tracks 44 running on it, a distance-sensitively reacting magnetic coil is made available, so that communication with the antenna unit 19 of the read/write device 20, which is likewise formed for example as a coil, in the reading head 232 is possible only over very small distances. This prevents mistaken associations and false readouts when there are a large number of mating plug-in connector elements $210_1$ to $210_5$ disposed in a housing wall 222.

If, for example, the reading head 232 with the antenna unit 19 is moved in the direction of the mounting sleeve 218, an interaction with the information carrier unit 10' takes place substantially when the antenna unit 19 is within the aperture 43 in the base 40' of the information carrier unit 10', and consequently influences the magnetic field permeating said aperture of the coil formed by the conductor track 44.

Figure 35:
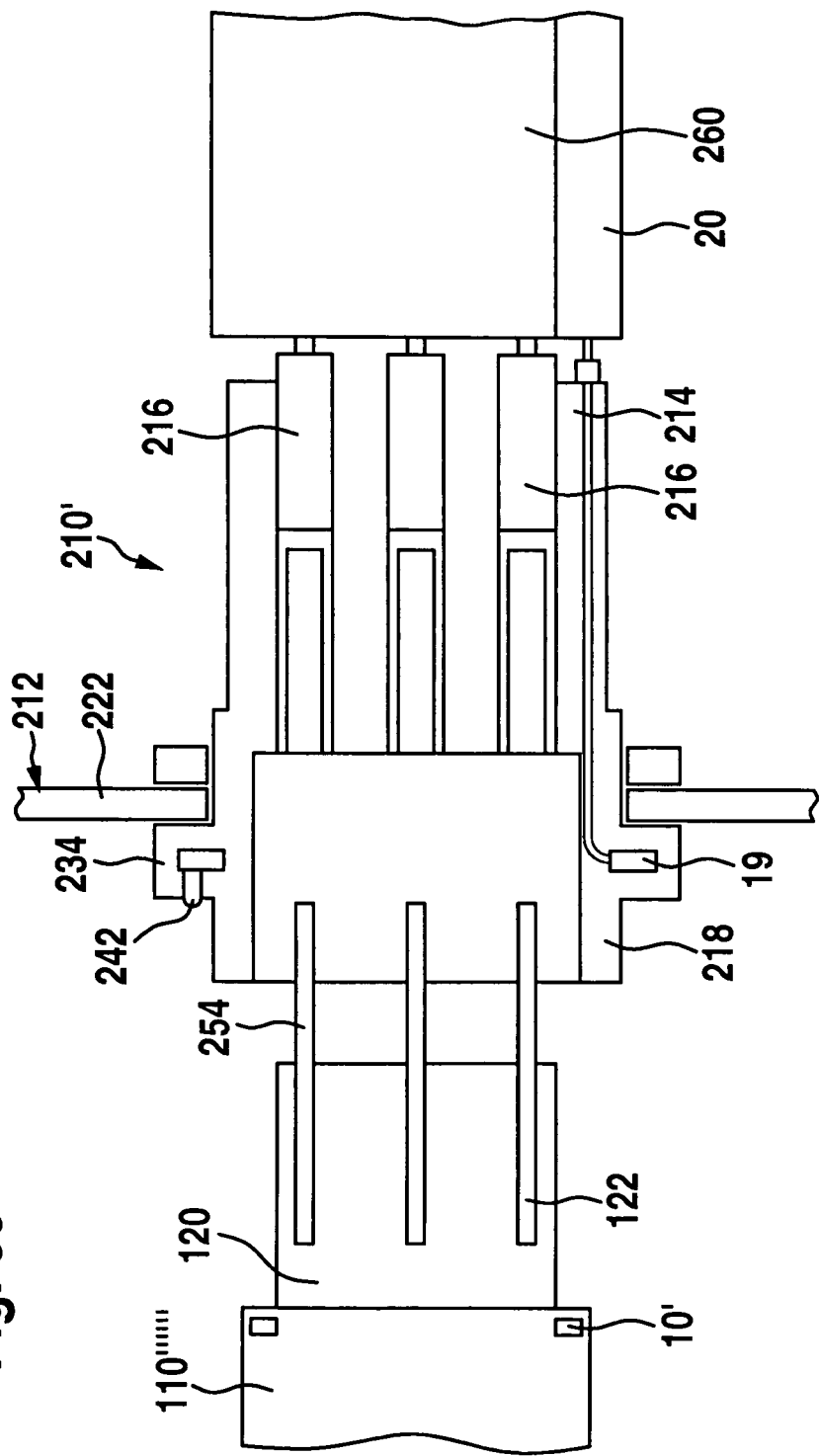
FIG. 35 shows a section similar to FIG. 33 through a further exemplary embodiment of a plug-in connector element according to the invention with a mating plug-in connector element.

In the case of a further exemplary embodiment of a cable receiving unit, formed as a mating plug-in connector element 210', the antenna unit 19 of the read/write device 20, disposed for example separately from the mounting sleeve 218, is disposed in the mounting sleeve 218, as represented in FIG. 35, for example in a flange element 234 of the same, it being possible for the flange element 234 either to be formed in two parts, so that the antenna unit 19 can be placed in, or formed such that the antenna unit 19 is embedded in it.

The read/write device 20 in this case communicates with an information carrier unit 10', which is disposed in a plug-in connector element 110'''', that has, for example, the contact base 120 with plug-in contacts 122, which can be inserted into the contact sleeves 216.

If, therefore, the plug-in connector element 110'''' is inserted with its plug-in contacts 122 into the contact sleeves 216, the antenna unit 18 of the information carrier unit 10' in the plug-in connector 110'''' and the antenna unit 19 of the read/write device 20 lie so close together that their antenna units 19 and 18 can interact to exchange information by way of electromagnetic fields.

There is consequently the possibility, for example, that the read/write device 20 that is associated with the plug-in connector element 210' is capable of detecting whether the plug-in connector element 110'''' is the correct plug-in connector element that should be inserted into the mating plug-in connector element 210'. This information is stored in the information carrier unit 10' in the plug-in connector element 110'''' and can be easily transmitted.

For example, in this case there is the possibility of activating an indicating element 242 provided on the mounting sleeve 218, or a number of indicating elements 242 of this kind, by the read/write device 20 in the case of incorrect or correct plug-in connection, so that said elements indicate optically and/or acoustically for a user whether or not the plug-in connector element 110'''' is the correct element.

It can easily be ensured in this way that only the correct plug-in connector element 110'''' is inserted into the respective mating plug-in connector element 210'.

For example, there is also the possibility of storing in the information carrier unit 10' in the plug-in connector element 110'''', the information concerning to which item of equipment, to which measuring head or to which application device the plug-in connector element 110'''' is connected, so that— for example in the case of applications where safety or security is highly relevant—verification of the plug-in connection established between the mating plug-in connector element 210' and the plug-in connector element 110'''' can be checked directly for a user when said connection is being established. One application for safeguarding plug-in connections in this way is, for example, the area of medical equipment.

As an alternative or in addition to this, it is likewise possible for the read/write device 20 that is associated with the mounting sleeve 218 to interact with a safety circuit 260 that is disposed in the housing 212 and connected ahead of the contact sleeves 216, in order to activate the safety circuit 260 in a way corresponding to the plug-in connection established between the mating plug-in connector element 210' and the plug-in connector element 110'''', so that the safety device 260 either activates a connection to an item of equipment disposed within the housing 212, and consequently establishes a connection between this equipment and the contact sleeves 216, to be specific when the plug-in connector element 110'''' is the correct one, and in particular is connected to the correct unit, or deactivates a connection to the equipment, and consequently interrupts the connection to the contact sleeves 216, to be specific when the incorrect plug-in connector element 110'''' has been inserted into the mating plug-in connector element 210' and this mistake has not been noticed.

As an alternative or in addition, it is also possible in the case of this exemplary embodiment to pick up the cable assembly 100 as such by way of the data as such that are stored in the information carrier unit 10' or, in the case of a cable assembly 100', to read out, by way of the information carrier network, the values picked up by the sensors 30 of the information carrier units 10'''' that are disposed in the cable portion 102.

The invention claimed is:

1. Cable assembly, comprising:
   a cable portion, and
   a cable receiving unit being formed as a plug-in connector element, said cable receiving unit comprising an information carrier unit from which information can be read out by electromagnetic field coupling, said information carrier unit comprising a memory in which at least one of design data and functional data of said cable assembly is stored; and
   the plug-in connector element having a contact insert for establishing a connection with a corresponding contact insert of a corresponding plug-in connector element.

2. Cable assembly according to claim 1, wherein the information carrier unit comprises:
   a base;
   an integrated circuit disposed on the base; and
   an electrical conductor acting as an antenna unit disposed on the base.

3. Cable assembly according to claim 2, wherein the base is formed from a bending-resistant material.

4. Cable assembly according to claim 2, wherein the base is formed from a flexible material.

5. Cable assembly according to claim 1, wherein design data can be read out from the information carrier unit.

6. Cable assembly according to claim 1, wherein functional data can be read out from the information carrier unit.

7. Cable assembly according to claim 1, wherein data of the cable assembly can be read out from the information carrier unit.

8. Cable assembly according to claim 1, wherein measurement data of the cable assembly can be read out from the information carrier unit.

9. Cable assembly according to claim 1, wherein use data can be read out from the information carrier unit.

10. Cable assembly according to claim 1, wherein the information carrier unit communicates with a further information carrier unit.

11. Cable assembly according to claim 10, wherein:
    the information carrier unit is disposed on a device associated with the cable receiving unit; and
    the cable portion and cable receiving unit are combined to form the cable assembly.

12. Cable assembly according to claim 10, wherein the information carrier unit communicates with at least one information carrier unit in the cable portion.

13. Cable assembly according to claim 12, wherein the information carrier unit communicates in a non-contact manner with the at least one information carrier unit in the cable portion.

14. Cable assembly according to claim 1, wherein the memory has a memory area in which items of information once written are stored such that they are write-protected.

15. Cable assembly according to claim 1, wherein the memory has a memory area in which items of information are stored such that they are write-protected by an access code.

16. Cable assembly according to claim 1, wherein the memory has a memory area to which information can be freely written.

17. Cable assembly according to claim 1, wherein:
the information carrier unit picks up measured values of an associated sensor; and
the information carrier stores the measured values in the memory.

18. Cable assembly according to claim 17, wherein the sensor picks up state variables comprising at least one of radiation, temperature, tension, pressure, elongation and moisture.

19. Cable assembly according to claim 17, wherein the information carrier unit picks up the measured values in an activated state.

20. Cable assembly according to claim 17, wherein the information carrier unit only stores a respective one of the measured values in the memory if the respective measured value exceeds a threshold value.

21. Cable assembly according to claim 1, wherein said information carrier unit and said plug-in connector element communicate with an information carrier unit provided in said cable portion.

22. Cable assembly according to claim 1, wherein the cable receiving unit further comprises a base part.

23. Cable assembly according to claim 22, wherein the information carrier unit is disposed in a recess in the base part.

24. Cable assembly according to claim 22, wherein the information carrier unit is one of disposed in the base part, disposed on the base part, or embedded in the base part.

25. Cable assembly according to claim 1, wherein the information carrier unit is disposed in a holding unit of the cable receiving unit, the holding unit engaging the cable portion.

26. Cable assembly according to claim 25, wherein the information carrier unit is disposed in a part of the holding unit that engages the cable portion in a frictionally retaining manner.

27. Cable assembly according to claim 25, wherein the information carrier unit is disposed in a recess provided on the holding unit.

28. Cable assembly according to claim 1, wherein the information carrier unit is associated with a contact carrier of the cable receiving unit.

29. Cable assembly according to claim 28, wherein the information carrier unit is disposed in a recess in the contact carrier.

30. Cable assembly according to claim 28, wherein the information carrier unit is embedded in material of the contact carrier.

* * * * *